US008089390B2

(12) United States Patent
Jones et al.

(10) Patent No.: US 8,089,390 B2
(45) Date of Patent: Jan. 3, 2012

(54) SENSOR CART POSITIONING SYSTEM AND METHOD

(75) Inventors: Ross Peter Jones, Cambridge (GB); Peter John Kelly, Cambridge (GB)

(73) Assignee: Underground Imaging Technologies, Inc., Latham, NY (US)

( * ) Notice: Subject to any disclaimer, the term of this patent is extended or adjusted under 35 U.S.C. 154(b) by 1245 days.

(21) Appl. No.: 11/804,217

(22) Filed: May 16, 2007

(65) Prior Publication Data

US 2010/0259438 A1 Oct. 14, 2010

Related U.S. Application Data

(60) Provisional application No. 60/800,874, filed on May 16, 2006.

(51) Int. Cl.
*G01S 13/00* (2006.01)

(52) U.S. Cl. ............... 342/22; 342/104; 342/195

(58) Field of Classification Search .................. 342/22
See application file for complete search history.

(56) References Cited

U.S. PATENT DOCUMENTS

| | | | |
|---|---|---|---|
| 3,288,242 A | 11/1966 | Loeb | |
| 4,297,699 A | 10/1981 | Fowler et al. | |
| 4,430,653 A | 2/1984 | Coon et al. | |
| 4,492,865 A | 1/1985 | Murphy et al. | |
| 4,686,475 A | 8/1987 | Kober et al. | |
| 4,814,768 A | 3/1989 | Chang | |
| 4,873,513 A | 10/1989 | Soults et al. | |
| 4,896,116 A | 1/1990 | Nagashima et al. | |
| 5,103,920 A | 4/1992 | Patton | |
| 5,321,613 A | 6/1994 | Porter et al. | |
| 5,337,002 A | 8/1994 | Mercer | |
| 5,341,886 A | 8/1994 | Patton | |
| 5,412,623 A | 5/1995 | Asada et al. | |
| 5,420,589 A | 5/1995 | Wells et al. | |
| 5,469,155 A | 11/1995 | Archambeault et al. | |

(Continued)

FOREIGN PATENT DOCUMENTS

DE 9108986 12/1991

(Continued)

OTHER PUBLICATIONS

Aaltonen et al., Geological Mapping Using GPR and Differential GPS Positioning: A Case Study, Proceedings of the Ninth International Conference on GPR, Apr. 29-May 2, 2002, Santa Barbara, California, Stockholm AB (Sweden), pp. 207-210.

(Continued)

*Primary Examiner* — Timothy A Brainard
(74) *Attorney, Agent, or Firm* — Hollingsworth & Funk, LLC

(57) ABSTRACT

A movable platform has a front end, a back end, a longitudinal axis, and at least one axle oriented generally transverse to the longitudinal axis and located between the front and back ends for supporting wheels of the platform. A position sensor is affixed on the platform at a location other than at a location defined by a plane passing through the axle and normal to the longitudinal axis. The position sensor provides position data as the platform traverses a path. A sensor arrangement is supported by the platform and configured to provide subsurface sensor data as the platform traverses the path. A processor is configured to associate the position data with the sensor data relative to a reference frame and in a manner that accounts for dynamic motion of the platform.

26 Claims, 21 Drawing Sheets

U.S. PATENT DOCUMENTS

| | | | |
|---|---|---|---|
| 5,499,029 A | 3/1996 | Bashforth et al. | |
| 5,528,518 A | 6/1996 | Bradshaw et al. | |
| 5,544,052 A | 8/1996 | Fujita et al. | |
| 5,546,572 A | 8/1996 | Seto et al. | |
| 5,553,407 A | 9/1996 | Stump | |
| 5,585,726 A | 12/1996 | Chau | |
| 5,614,670 A | 3/1997 | Nazarian et al. | |
| 5,631,970 A | 5/1997 | Hsu | |
| 5,633,589 A | 5/1997 | Mercer | |
| 5,644,237 A | 7/1997 | Eslambolchi et al. | |
| 5,659,985 A | 8/1997 | Stump | |
| 5,673,050 A | 9/1997 | Moussally et al. | |
| 5,682,136 A | 10/1997 | Del Signore | |
| 5,698,981 A | 12/1997 | Mercer | |
| 5,704,142 A | 1/1998 | Stump | |
| 5,711,381 A | 1/1998 | Archambeault et al. | |
| 5,720,354 A | 2/1998 | Stump et al. | |
| 5,746,278 A | 5/1998 | Bischel et al. | |
| 5,757,320 A | 5/1998 | McEwan | |
| 5,764,062 A | 6/1998 | Mercer | |
| 5,767,678 A | 6/1998 | Mercer | |
| 5,769,503 A | 6/1998 | Stolarczyk et al. | |
| 5,774,091 A | 6/1998 | McEwan | |
| 5,786,537 A | 7/1998 | Anstey | |
| 5,805,110 A | 9/1998 | McEwan | |
| 5,819,859 A | 10/1998 | Stump et al. | |
| 5,825,660 A | 10/1998 | Cagan et al. | |
| 5,844,564 A | 12/1998 | Bennis et al. | |
| 5,867,117 A | 2/1999 | Gogineni et al. | |
| 5,904,210 A * | 5/1999 | Stump et al. | 175/45 |
| 5,933,014 A | 8/1999 | Hartrumpf et al. | |
| 6,014,343 A | 1/2000 | Graf et al. | |
| 6,035,951 A | 3/2000 | Mercer et al. | |
| 6,078,869 A | 6/2000 | Gunasekera | |
| 6,088,294 A | 7/2000 | Leggett, III et al. | |
| 6,106,561 A | 8/2000 | Farmer | |
| 6,119,067 A * | 9/2000 | Kikuchi | 701/300 |
| 6,119,804 A | 9/2000 | Owen | |
| 6,151,555 A | 11/2000 | Van Bemmel et al. | |
| 6,195,922 B1 | 3/2001 | Stump | |
| 6,225,941 B1 | 5/2001 | Gogineni et al. | |
| 6,252,538 B1 | 6/2001 | Chignell | |
| 6,302,221 B1 | 10/2001 | Hamman et al. | |
| 6,307,573 B1 | 10/2001 | Barros | |
| 6,308,787 B1 | 10/2001 | Alft | |
| 6,313,755 B1 | 11/2001 | Hetmaniak et al. | |
| 6,315,062 B1 | 11/2001 | Alft et al. | |
| 6,373,486 B1 | 4/2002 | Simpson | |
| 6,377,201 B1 | 4/2002 | Chu | |
| 6,377,210 B1 | 4/2002 | Moore | |
| 6,389,360 B1 | 5/2002 | Alft et al. | |
| 6,435,286 B1 | 8/2002 | Stump et al. | |
| 6,437,726 B1 | 8/2002 | Price | |
| 6,462,696 B1 | 10/2002 | Gorman | |
| 6,477,795 B1 | 11/2002 | Stump | |
| 6,484,818 B2 | 11/2002 | Alft et al. | |
| 6,501,413 B2 | 12/2002 | Annan et al. | |
| 6,532,190 B2 | 3/2003 | Bachrach | |
| 6,667,709 B1 | 12/2003 | Hansen et al. | |
| 6,700,526 B2 * | 3/2004 | Witten | 342/22 |
| 6,701,647 B2 | 3/2004 | Stump | |
| 6,719,069 B2 | 4/2004 | Alft et al. | |
| 6,739,165 B1 | 5/2004 | Strack | |
| 6,751,553 B2 | 6/2004 | Young et al. | |
| 6,755,263 B2 | 6/2004 | Alft et al. | |
| 6,766,253 B2 | 7/2004 | Burns et al. | |
| 6,833,795 B1 | 12/2004 | Johnson et al. | |
| 6,886,644 B2 | 5/2005 | Stump et al. | |
| 6,915,211 B2 | 7/2005 | Kram et al. | |
| 6,975,942 B2 | 12/2005 | Young et al. | |
| 6,980,482 B2 | 12/2005 | Faichney et al. | |
| 6,999,021 B2 | 2/2006 | Taylor | |
| 7,013,991 B2 | 3/2006 | Wilson-Langman et al. | |
| 7,034,740 B2 | 4/2006 | Witten | |
| 7,085,196 B2 | 8/2006 | Nemeth | |
| 7,113,124 B2 | 9/2006 | Waite | |
| 7,123,016 B2 | 10/2006 | Larsen | |
| 7,143,844 B2 | 12/2006 | Alft et al. | |
| 7,182,151 B2 | 2/2007 | Stump et al. | |
| 7,184,611 B2 | 2/2007 | Miyagi et al. | |
| 7,218,244 B2 | 5/2007 | Jin et al. | |
| 7,400,976 B2 | 7/2008 | Young et al. | |
| 7,424,133 B2 | 9/2008 | Schultz et al. | |
| 7,612,704 B2 | 11/2009 | Ryerson et al. | |
| 7,676,534 B2 | 3/2010 | Murakami et al. | |
| 2001/0035836 A1 * | 11/2001 | Miceli et al. | 342/22 |
| 2003/0012411 A1 | 1/2003 | Sjostrom et al. | |
| 2004/0168358 A1 | 9/2004 | Stump | |
| 2006/0055584 A1 * | 3/2006 | Waite et al. | 342/22 |
| 2006/0129291 A1 * | 6/2006 | Lu et al. | 701/36 |
| 2006/0152407 A1 * | 7/2006 | Hatch et al. | 342/357.03 |
| 2008/0079723 A1 | 4/2008 | Hanson et al. | |

FOREIGN PATENT DOCUMENTS

| | | |
|---|---|---|
| DE | 19509934 | 10/1995 |
| DE | 19845330 | 4/2000 |
| DE | 10018031 | 10/2001 |
| FR | 2673002 | 8/1992 |
| NL | 9002065 | 4/1992 |

OTHER PUBLICATIONS

AWPA—"Uniform Color Code", Mar. 6, 2001—http://web.archive.org/web/20010306004125/http://www.callbeforeyoudig.org/color.htm.

Bakhtar et al., "Testing and UXO Detection Using US Air Force EarthRadar System," Mar. 1996.

Bernold et al., "A Multi-Sensory Approach to 3-D Mapping of Underground Utilities", 19th Proceedings of International Symp. on Automation & Robotics in Construction, Sep. 23-25, 2002.

"Drill Path," Infrasoft, LLC., Computer Software for Solving Infrastructure Problems, 2916 West T.C. Jester, Houston, Texas 77018, 20 pages.

Dobecki, T.L. et al. "Geotechnical and Groundwater Geophysics." Geophysics, vol. 50, No. 12, Dec. 1985, p. 2621-2636.

Dussauge-Peisser et al., Investigation of a fractured limestone cliff (Chartreuse Massif, France) using seismic tomography and ground-penetrating radar: Near Surface Geophysics, 1, 161-170, Aug. 2003.

Figdor H. et al. "Geophysical reconnaissance of covered waste disposal grounds." OEIAZ Austrian Engineer and Architects' Magazine, vol. 134, No. 9, Austria, Sep. 1989. pp. 450-456.

Frohlich et al., Exploring geo-scientific data in virtual environments, Proceedings of the Conference on Visualization 1999: Celebrating Ten Years, IEEE Visualization, IEEE Computer Society Press, Los Alamitos, CA, pp. 169-173, Oct. 1999.

Herman, Robotic Subsurface Mapping Using Ground Penetrating Radar, PhD thesis, Carnegie Mellon University, May 1997, 143 pages.

Hodgson, Computerized Well Planning for Directional Wells, SPE, No. 12071, Oct. 8, 1983, pp. 1-6, abstract only.

http://www.ditchwitch.com/produtct/productview/138 "Ditch Witch Subsite Trac Management System Plus", Accessed Aug. 13, 2002.

Liu, "Using GPR and seismic reflection measurements to characterize buried objects: large-scale simulation." IGARSS '97. 1997 In'tl Geoscience and Remote Sensing Symposium. pp. 1147-1149, vol. 3.

Liu et al. "Identification of paleo-liquefaction and deformation features with GPR in the New Madrid seismic zone." The 8th Int'l Conference of Ground Penetrating Radar. Goldcoast, May 23-26, 2000. vol. 4084, pp. 383-389 (abstract only).

McFee et al., Multisensor vehicle-mounted teleoperated mine detector with data fusion, Proc. SPIE, vol. 3392, 1082, 1998, abstract only.

Parker, "Buried Facility Locating with GPS Interface," GBIS '99, Edmonton, Dec. 1999.

Powers et al., "Integrated Use of Continuous Seismic-Reflection Profiling and Ground-Penetrating Radar Methods at John's Pond, Cape Cod, Massachusetts", 12th Proceeding on Applications of Geophysics to Eng. & Environment, 1999.

Santos, The Development and Field Application of a 3D Computer Graphics System for Displaying Wellbore Trajectories, SPE, No. 29197, Nov. 10, 1994, pp. 371-382.

Schwamborn et al. "Ground penetrating radar and shallow seismic—stratigraphic and permafrost investigations of Lake Nikolay, Delta Lena and Arctic Siberia." The 8th Int'l Conference of Ground Penetrating Radar. Goldcoast, May 23-26, 2000. vol. 4084, 2000, pp. 783-789, abstract only.

Shoemaker et al., Refection Seismic and Ground Penetrating Radar Study of Previously Mined (Lead/Zinc) Ground, Joplin, Missouri, Missouri Department of Transportation special publication, 2000, 15 pages.

White, R. "Building an Urban Image." Archeologia e Calcolatori (International Association of Computing in Archaeology, Rome Italy), vol. 7, 1996, 137-147, abstract only.

Yoder et al., Mapping agricultural fields with GPR and EMI to predict offsite movement of agrochemicals, Proc. SPIE, vol. 4084, 20, 2000, abstract only.

Office Action dated Aug. 1, 2003 from U.S. Appl. No. 09/881,656, 7 pages.

Office Action Response submitted Oct. 31, 2003 to office action dated Aug. 1, 2003 from U.S. Appl. No. 09/881,656, 4 pages.

Notice of Allowance dated Jan. 27, 2004 from U.S. Appl. No. 09/881,656, 6 pages.

Office Action dated Jun. 18, 2010 from U.S. Appl. No. 11/804,310, 29 pages.

Office Action dated Sep. 22, 2005 from U.S. Appl. No. 10/195,856, 19 pages.

Office Action Response submitted Mar. 22, 2006 to office action dated Sep. 22, 2005 from U.S. Appl. No. 10/195,856, 14 pages.

Office Action dated Jun. 28, 2006 from U.S. Appl. No. 10/195,856, 22 pages.

Office Action Response submitted Aug. 28, 2006 to office action dated Jun. 28, 2006 from U.S. Appl. No. 10/195,856, 10 pages.

Office Action Response with RCE submitted Oct. 30, 2006 to office action dated Jun. 28, 2006 from U.S. Appl. No. 10/195,856, 10 pages.

Office Action dated Jan. 4, 2007 from U.S. Appl. No. 10/195,856, 23 pages.

Office Action dated Mar. 8, 2005 from U.S. Appl. No. 10/867,885, 10 pages.

Office Action Response submitted Jul. 8, 2005 to office action dated Mar. 8, 2005 from U.S. Appl. No. 10/867,885, 7 pages.

Notice of Allowance dated Jul. 25, 2005 from U.S. Appl. No. 10/867,885, 6 pages.

Office Action dated Mar. 27, 2007 from U.S. Appl. No. 11/296,844, 8 pages.

Office Action Response submitted Aug. 27, 2007 from U.S. Appl. No. 11/296,844, 12 pages.

Office Action dated Nov. 16, 2007 from U.S. Appl. No. 11/296,844, 10 pages.

Office Action Response submitted Jan. 16, 2008 from U.S. Appl. No. 11/296,844, 7 pages.

Notice of Allowance dated Mar. 10, 2008 from U.S. Appl. No. 11/296,844, 7 pages.

Office Action dated Mar. 25, 2009 from U.S. Appl. No. 12/218,501, 6 pages.

Office Action Response submitted Jul. 27, 2009 from U.S. Appl. No. 12/218,501, 10 pages.

Office Action dated Nov. 19, 2009 from U.S. Appl. No. 12/218,501, 11 pages.

Office Action Response submitted Jan. 21, 2010 from U.S. Appl. No. 12/218,501, 8 pages.

Office Action Response with RCE submitted Mar. 19, 2010 from U.S. Appl. No. 12/218,501, 8 pages.

Office Action dated Apr. 2, 2010 from U.S. Appl. No. 12/218,501, 12 pages.

Office Action Response submitted Jun. 30, 2010 from U.S. Appl. No. 12/218,501, 9 pages Notice of Allowance dated Jul. 28, 2010 from U.S. Appl. No. 12/218,501, 6 pages.

Request for Continued Examination (RCE) submitted Aug. 24, 2010 for U.S. Appl. No. 12/218,501, 11 pages.

Notice of Allowance dated Jun. 29, 2009 from U.S. Appl. No. 12/262,140, 8 pages.

Office Action dated Jun. 26, 2008 from related European Application No. 01987887.5, 5 pages.

Office Action Response dated Jan. 6, 2009 from related European Application No. 01987887.5, 17 pages.

International Preliminary Examination Report dated Apr. 7, 2003 from related PCT Application No. PCT/US01/40996, 10 pages.

U.S. Appl. No. 11/728,726, filed Mar. 27, 2007, Krumhansl et al.

U.S. Appl. No. 11/804,310, filed May 16, 2007, Hanson et al.

van der Veen et al., Design and application of a towed land-streamer system for cost-effective 2-D and pseudo-3-D shallow seismic data acquisition, Geophysics, vol. 66, No. 2, (Mar.-Apr. 2001), p. 482-500.

Baker et al., Source-Dependent Frequency Content of Ultrashallow Seismic Reflection Data, Bulletin of the Seismological Society of America, 90, 2, p. 494-499, Apr. 2000.

File History for U.S. Appl. No. 11/801,310.

* cited by examiner

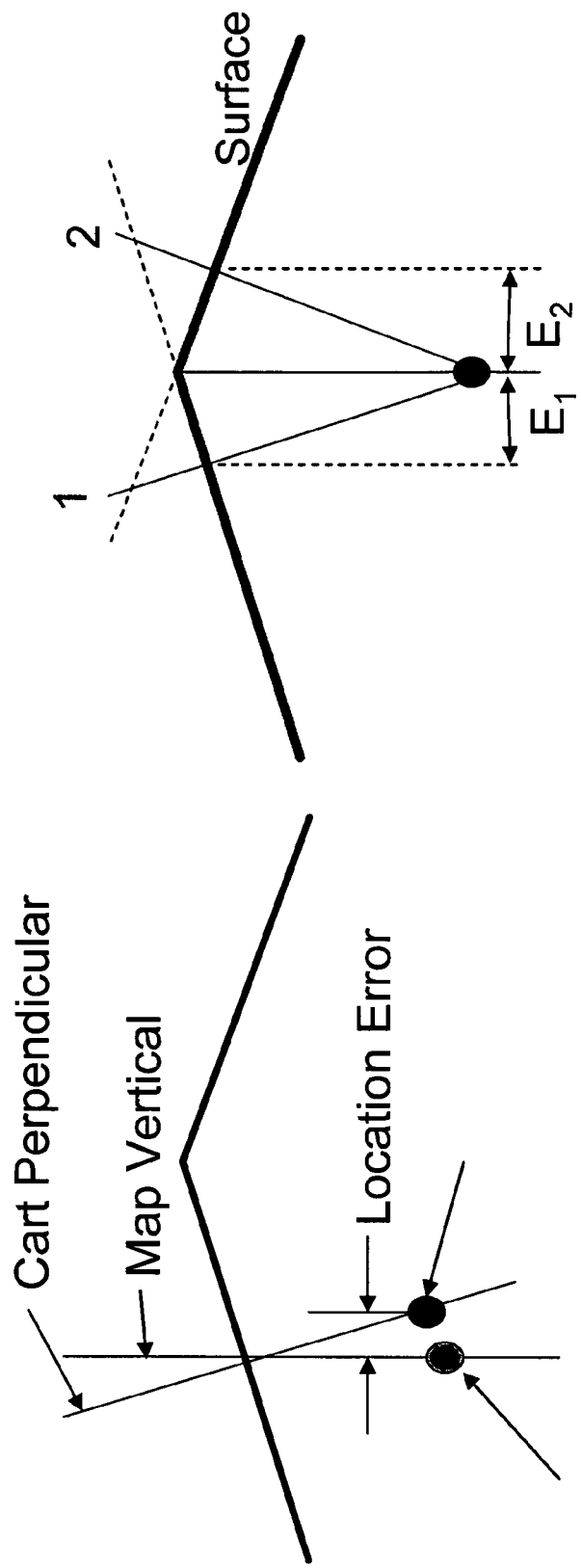

Horizontal Error Due to Slope Projection Onto Reference Surface

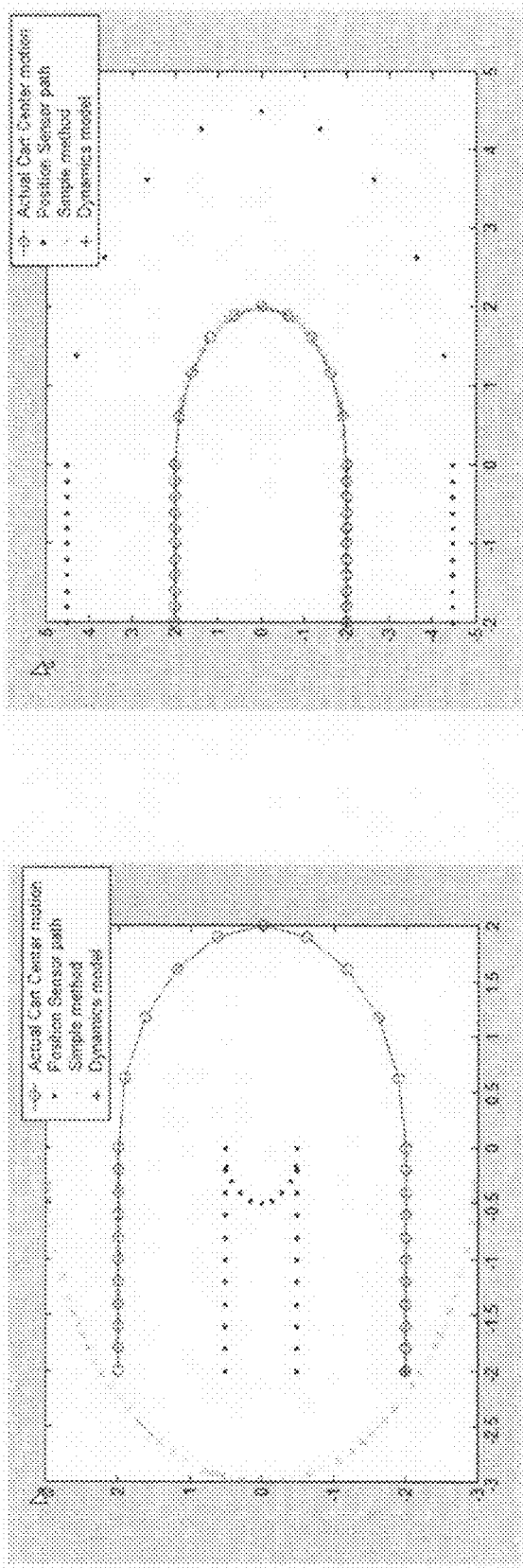

SENSOR CART POSITIONING SYSTEM AND METHOD

RELATED APPLICATION

This application claims the benefit of Provisional Patent Application Ser. No. 60/800,874 filed May 16, 2006, to which priority is claimed pursuant to 35 U.S.C. §119(e) and which is hereby incorporated herein by reference.

FIELD OF THE INVENTION

The present invention relates generally to equipment and methods used for surveying underground features. More specifically, the present invention relates to an apparatus and method for collecting subsurface survey data using a multiplicity of sensors and associating the subsurface survey data with positioning data in a manner that accounts for dynamic motion of the cart that supports the sensors, from which geometrically true positioning and co-registration of sensor data may be provided.

BACKGROUND

Various techniques have been developed to detect and locate underground utilities and other manmade or natural subsurface structures. It is well understood that before trenching, boring, or otherwise engaging in invasive subsurface activity to install or access utilities, it is imperative to know the location of any existing utilities and/or obstructions in order to assist in trenching or boring operations and minimize safety risks. Currently-existing location data for buried utilities, however, is often incomplete and suspect in terms of accuracy.

SUMMARY OF THE INVENTION

The present invention is directed to systems and methods for surveying underground features. Embodiments of the present invention are directed to systems and methods for collecting subsurface survey data using a multiplicity of sensors and associating the subsurface survey data with positioning data in a manner that accounts for dynamic motion of the platform that supports the sensors. Accounting for dynamic motion of the platform provides for geometrically true positioning and co-registration of a multiplicity of sensor data sets.

According to embodiments, an apparatus of the present invention includes a movable platform having a front end, a back end, a longitudinal axis, and at least one axle oriented generally transverse to the longitudinal axis and located between the front and back ends for supporting wheels of the platform. A position sensor is affixed on the platform at a location other than at a location defined by a plane passing through the axle and normal to the longitudinal axis. The position sensor provides position data as the platform traverses a path. A sensor arrangement is supported by the platform and configured to provide subsurface sensor data as the platform traverses the path. A processor is configured to associate the position data with the sensor data relative to a reference frame and in a manner that accounts for dynamic motion of the platform.

The processor may be configured to associate the position data with the sensor data relative to the reference frame and in a manner that accounts for velocity and orientation of the platform. The processor may be configured to associate geometrically correct position data with the sensor data relative to the reference frame. The reference frame may be a local reference frame or a global reference frame.

The sensor arrangement may be supported by the platform in a spaced-apart relationship relative to the position sensor. The sensor arrangement may include at least one of a ground penetrating radar, an electromagnetic imaging sensor, and a shallow application seismic sensor. The sensor arrangement may include a multi-channel sensor arrangement, and the processor may be configured to associate the position data with each of a multiplicity of channels of sensor data developed by the multi-channel sensor arrangement. The multi-channel sensor arrangement may include, for example, at least one of a multi-channel ground penetrating radar and a multi-unit electromagnetic imaging sensor. The sensor arrangement may include a multiplicity of disparate sensors that provide disparate subsurface sensor data, and the processor may be configured to associate the position data with disparate sensor data developed by the multiplicity of disparate sensors. The multiplicity of disparate sensors may include two or more of a ground penetrating radar, an electromagnetic imaging sensor, a shallow application seismic sensor, a magnetic field sensor, a resistivity sensor, a gravity sensor or other geophysical sensor.

The position sensor may be affixed on the platform laterally offset relative to a centerline of the sensor arrangement. The position sensor may cooperate with a ground station to track the position sensor relative to a fixed local coordinate system. The position sensor may include a laser positioning sensor or a GPS positioning sensor. The processor may be configured to apply GPS clock times to GPS location data for each discrete sensor of the sensor arrangement for every trace.

An apparatus of the present invention may further include a second movable platform mechanically coupled to a first movable platform. A second sensor arrangement is supported by the second movable platform and configured to provide subsurface sensor data as the second movable platform traverses the path. The processor may be configured to associate position data with sensor data provided by the sensor arrangement in the first movable platform and the second sensor arrangement in the second movable platform relative to a reference frame and in a manner that accounts for dynamic motion of the respective platforms. The processor may be configured to associate the position data with the sensor data provided by the sensor arrangement and the second sensor arrangement relative to the reference frame using the position sensor affixed only to one of the first and second movable platforms and a fixed location of a coupler that mechanically couples the first and second movable platforms.

According to other embodiments, a method of the present invention involves moving a platform along a path. The platform has a front end, a back end, a longitudinal axis, and at least one axle oriented generally transverse to the longitudinal axis and located between the front and back ends for supporting wheels of the platform. Position data is acquired relative to a location on the platform other than at a location defined by a plane passing through the axle and normal to the longitudinal axis. Subsurface sensor data is obtained at the platform as the platform traverses the path. The position data is associated with the sensor data relative to a reference frame and in a manner that accounts for dynamic motion of the platform. An output comprising the associated position and sensor data is produced.

Associating the data may involve associating the position data with the sensor data relative to the reference frame in a manner that accounts for velocity and orientation of the platform. Associating the data may involve comprises associating geometrically correct position data with the sensor data relative to the reference frame.

The subsurface sensor data may comprise at least one of ground penetrating radar data, electromagnetic imaging data, shallow application seismic sensor data, magnetic field data, resistivity data, and gravity data. The position data may comprise GPS positioning data or laser positioning data, for example. Methods of the present invention may involve obtaining subsurface sensor data from a plurality of discrete subsurface sensors, and applying clock times to the location data for each sample of sensor data obtained by each discrete subsurface sensor.

According to further embodiments, a method of the present invention involves moving a second platform along the path, with the second platform mechanically coupled to a first platform at a coupling location. Second position data is computed for the second platform relative to the coupling location and the location on the platform other than at the location defined by the plane passing through the axle and normal to the longitudinal axis. Second subsurface sensor data is obtained at the second platform as the second platforms traverses the path. The second position data is associated with the second sensor data relative to the reference frame in a manner that accounts for dynamic motion of the second platform. An output is produced comprising the associated second position data and second sensor data. Associating the position data and producing the output may be performed after completion of a survey involving the moving, acquiring, and obtaining processes.

The above summary of the present invention is not intended to describe each embodiment or every implementation of the present invention. Advantages and attainments, together with a more complete understanding of the invention, will become apparent and appreciated by referring to the following detailed description and claims taken in conjunction with the accompanying drawings.

BRIEF DESCRIPTION OF FIGURES

FIGS. 2 and 3 are depictions of a sensor cart situated on a slope and how depth dependent errors arise from this orientation of the sensor cart in accordance with conventional sensor position measuring approaches;

FIGS. 9-13 show various scenarios of a sensor cart that facilitate an enhanced understanding of a cart dynamics algorithm according to embodiments of the present invention;

Figure 1:
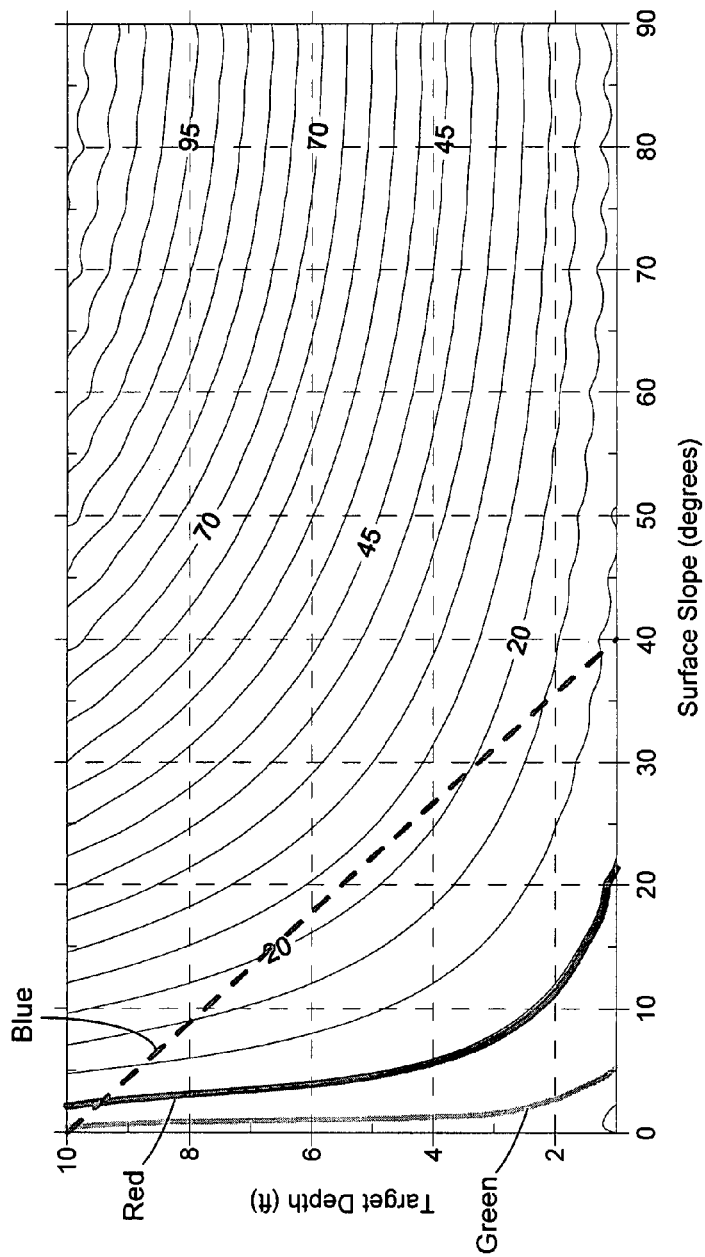
FIG. 1 is a plot showing horizontal error that reduces the accuracy of sensor positioning measurements using conventional measurement approaches, the horizontal error dependant on target depth and ground slope.

While the invention is amenable to various modifications and alternative forms, specifics thereof have been shown by way of example in the drawings and will be described in detail below. It is to be understood, however, that the intention is not to limit the invention to the particular embodiments described. On the contrary, the invention is intended to cover all modifications, equivalents, and alternatives falling within the scope of the invention as defined by the appended claims.

DESCRIPTION OF VARIOUS EMBODIMENTS

In the following description of the illustrated embodiments, references are made to the accompanying drawings which form a part hereof, and in which is shown by way of illustration, various embodiments in which the invention may be practiced. It is to be understood that other embodiments may be utilized, and structural and functional changes may be made without departing from the scope of the present invention.

The present invention is directed to systems and methods for acquiring highly accurate positioning data for one or more sensors configured for subsurface sensing and transport over a path. The present invention is further directed to associating the sensor data with geometrically correct position data acquired for a survey path traversed by a platform, such as a cart, supporting the sensor arrangement. Geometrically correct position data, or "true geometry," refers to very accurate positioning and co-registration of all data sets, which is achieved through use of a cart dynamics mathematical model that allows sensor position to be accurately determined.

A cart dynamics model of the present invention advantageously accounts for dynamic motion of the sensor platform that has heretofore been ignored (i.e., assumed not to be present or errors introduced by same tolerated) by known positioning and surveying systems and methods. A cart dynamics modeling approach of the present invention, for example, accounts for velocity and orientation of the sensor platform. Positioning data that is assigned to discrete sensor data samples is geometrically correct, as dynamic motion errors that adversely affect conventional positioning and surveying systems and methods are accounted for by a cart dynamics modeling technique of the present invention.

Surveys are typically performed on straight level roads and parking lots, often by use of a combination of dead reckoning, calibrated survey wheel distances, and global positioning system (GPS) sensors. Such conventional techniques generally yield accuracies on the order of up to a foot. Although inaccuracies on the order of 10 to 12 inches may be acceptable in some application, such large positioning errors can render subsurface surveys of underground utilities, for example, suspect or unusable.

Fundamental limitations that impact the accuracy by which an underground target can be located are associated with the antenna and scan spacing. For example, a given antenna array may have receivers that are spaced at 12 cm. In this case, the closest one can locate a target cross track is ±6 cm (2.4 inches). A similar limitation occurs in the direction of travel. For example, if the scan spacing is 2.54 cm (1.0 inch), then the location accuracy limit is ±1.27 cm (0.5 inch). Finally, due to the wavelength of the radar, there is an accuracy limit in the vertical direction, which may be about ±7.5 cm (3 inches), for example.

A number of different errors arising from different sources negatively impact the accuracy of conventional surveys. Many of these errors are either ignored or inadequately accounted for using conventional positioning techniques, thereby reducing the accuracy of the resulting survey.

One category of errors includes those that are due largely to surface slope. There are at least two different error sources relating to surface slope. The first is a depth dependent error. This error is caused by the tilt of the sensor platform, such as a cart, relative to the ground. For example, a GPR (ground penetrating radar) sensor may be mounted on a cart that facilitates movement of the GPR sensor along a survey path. The radar return is due to a target located beneath the cart, on a line normal to the ground surface that is not vertical (shortest path from source to target). The radar data are plotted as if it were vertically below the antenna, giving rise to a horizontal error that depends on the target depth and ground slope. This error may occur whether the survey lines are along or perpendicular to contours. A graph of this error versus surface slope and target depth is shown in FIG. 1.

FIGS. 2 and 3 are depictions of a sensor cart, situated on a slope and how depth dependent errors arise from this orientation of the sensor cart. If, for example, a target is 5 feet deep beneath a surface with a slope of 10 degrees, there is a horizontal location error of about 10 inches. For both accuracy of results and operational issues, slopes should generally be less than 40 degrees.

Figure 4:
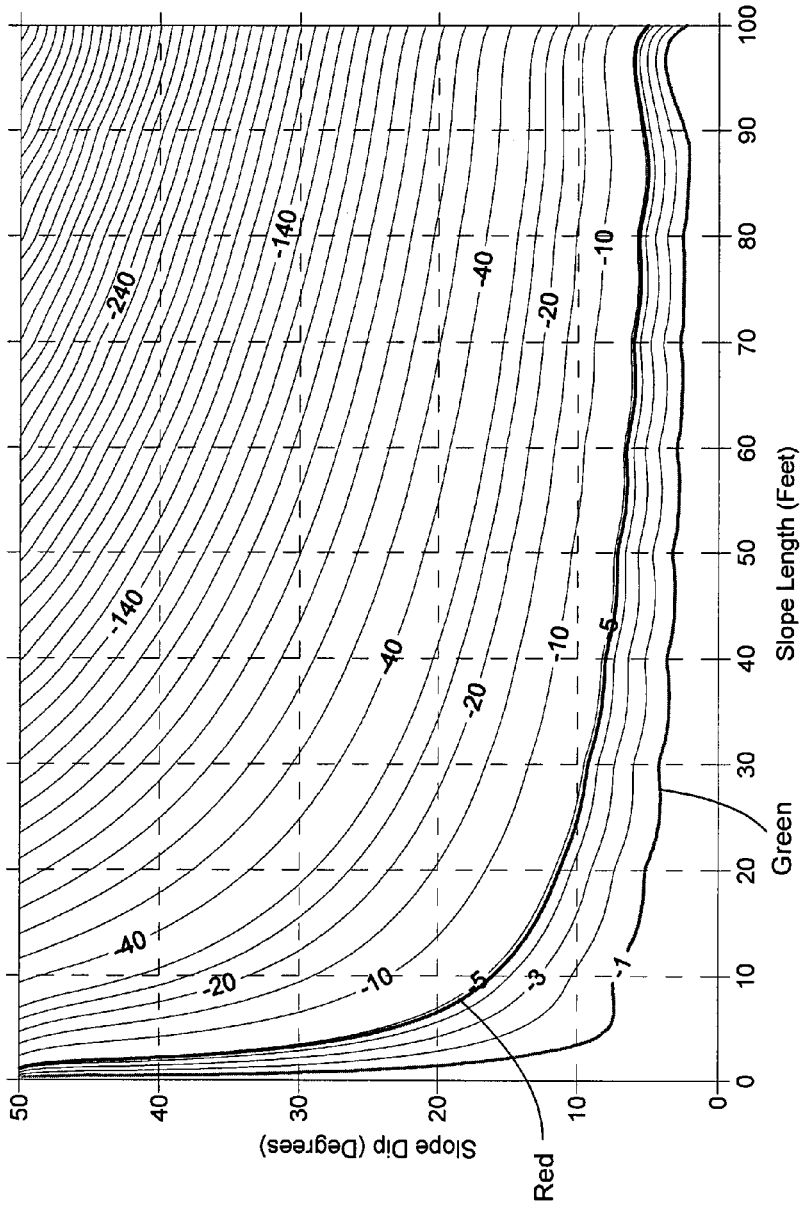
FIG. 4 is a plot showing horizontal error due to slope projection onto a reference surface that reduces the accuracy of sensor positioning measurements using conventional measurement approaches.

Another category of errors includes those that arise using conventional techniques that rely on use of a survey wheel on a sloped surface. Here, the error is due to the fact that the line length projected on a horizontal reference plane is shorter than the length on the ground. Without using a more accurate approach to survey control, such as that provided by GPS positioning, this results in an error that accumulates with the length of the slope and depends on the slope angle. A plot for this error is shown in FIG. 4. From the plot of FIG. 4, it can be seen that the horizontal error after traveling 20 feet on a 10 degree slope is about 4 inches.

When traveling downhill, the two errors discussed above are additive. For example, the total error possible after traveling 20 feet downhill on a 10 degree slope and detecting a target at 5 foot depth is about 14 inches. However, the error traveling uphill is the difference of these two values and so would be 6 inches. In a significant percentage of surveys, surface slopes ranging from 0 degrees to nearly 15 degrees are often encountered. So, the potential horizontal error could range to about 24 inches.

A third category of errors includes errors in line length due to cart and wheel encoder 'crabbing.' In this case, an error occurs if the cart is not tracking correctly behind the tow vehicle. For example, if the cart is being towed along a contour line of a slope, and the cart begins to slip downhill while it is being pulled forward by the tow vehicle (an ATV for example), the distance measured by the wheel encoder will be different than the actual line length, because the wheel is slipping or crabbing.

Figure 5:
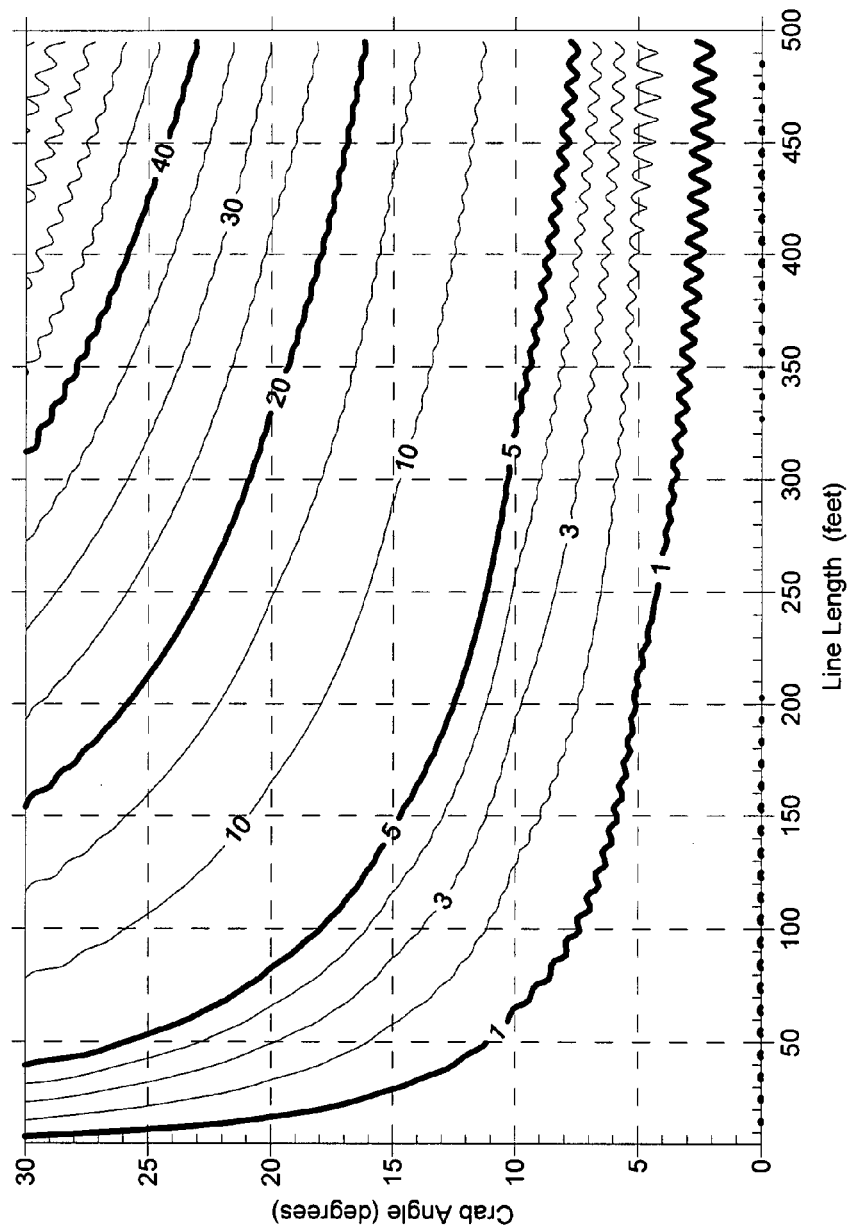
FIG. 5 shows a plot showing the effect of wheel encoder "crabbing" on line length that can significantly reduce the accuracy of sensor positioning measurements using conventional measurement approaches.

Discrepancies have been found between the line length recorded by the wheel encoder and that computed from the GPS positions along the survey line. Experimentation has revealed differences between the wheel encoder and GPS of between 0.2 feet and 12 feet, with the wheel encoder distance always being shorter. The plot provided in FIG. 5 shows the computed differences in line length due to crabbing as a function of crab angle (or the angle between the direction of travel and the plane of the encoder wheel). This crabbing error dynamic turns out to be a potentially major source of error. Where the other errors are measured in inches, this error can easily be on the order of feet.

A surveying approach in accordance with embodiments of the present invention provides for position data that is associated with sensor data in a manner that accounts for dynamic motion of the sensor cart, thereby accounting for the sources of error discussed above. A surveying approach of the present invention provides for sensor data that is associated with geometrically correct position data for one or more sensors configured for subsurface sensing. Embodiments of the present invention advantageously avoid or render negligible the aforementioned errors that negatively impact the accuracy of subsurface surveys produced using conventional techniques.

Figure 6:
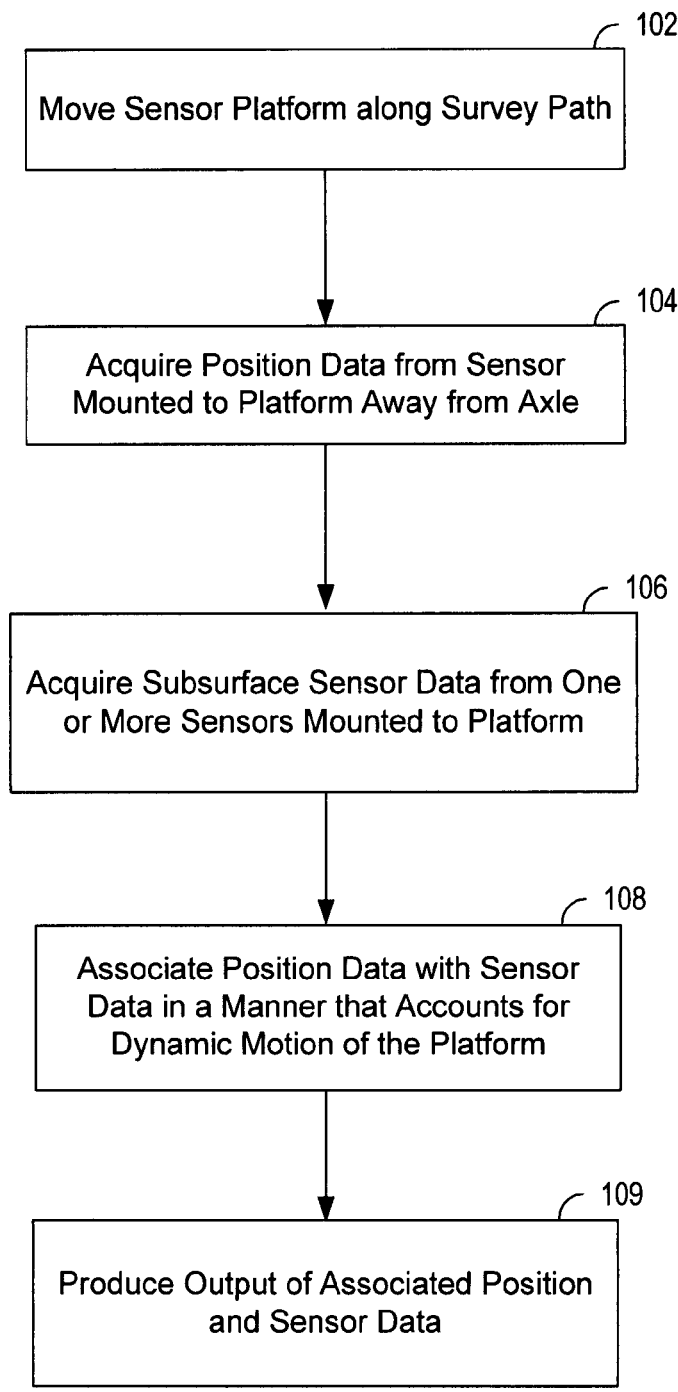
FIG. 6 shows processes for performing a survey of a subsurface in accordance with embodiments of the present invention.

FIG. 6 shows processes for performing a survey of a subsurface in accordance with embodiments of the present invention. According to the embodiment of FIG. 6, a platform, such as a cart, is equipped with one or more sensors and moved 102 along a survey path. Position data is acquired 104 using a sensor that is mounted to the cart. The position sensor that is mounted to the cart is preferably a GPS sensor. The mounting location of the position sensor in or on the cart is important so that errors associated with conventional positioning techniques are avoided and highly accurate positioning data can be acquired in accordance with techniques of the present invention.

In particular, position data is acquired using a position sensor mounted to the platform, such as a cart, away from the axle (e.g., at a cart location in front of or behind the wheel axle, which may also be off-center with respect to the center of the platform). In general, it is convenient to mount the position sensor on or in the sensor cart. However, it is understood that the position sensor may be mounted elsewhere on the movable structure that includes or is otherwise coupled to the sensor cart. The position sensor may be affixed on the cart at a location laterally offset relative to a centerline of the sensor arrangement or a centerline of the cart. For example, the positioning sensor may also be affixed at an elevation differing from that of the subsurface sensor(s). It has been found that, in some configurations, positioning accuracy increases as the separation distance between the position sensor and axle increases.

A cart dynamics model of the present invention accounts for dynamic motion of the sensor cart, such by accounting for velocity and orientation of the sensor cart. A cart dynamics model of the present invention accounts for positional offset between the positioning sensor and each of the subsurface sensing devices (e.g., a single device or individual sensing elements of an arrayed sensing device). The cart dynamics model may account for X and Y coordinate offsets (and Z coordinate if desired), as well as offsets associated with a tow point and tow distance for sensor carts that are hitched to a tow vehicle. For example, a sensing system according to embodiments of the present invention may include two sensor carts. A first sensor cart may support a GPR sensor arrangement and a position sensor, and a second sensor cart may support an EMI sensor arrangement. The second cart is generally mechanically coupled to the movable cart, at a tow point and a tow distance relative to a hitch location at the first sensor cart. A processor configured to implement a cart dynamics model of the present invention associates the sensor data provided by the GPR sensor arrangement and the EMI sensor arrangement with geometrically correct position data, preferably relative to a reference frame.

According to one approach, a single position sensor may be used to provide highly accurate positioning for a multiplicity of sensor carts that are mechanically coupled together, in a daisy-chained fashion. For example, the location of one position sensor on a first sensor cart may be used to derive the sensor positions on the trailing cart or carts. A first sensor cart may support a primary position sensor, and this primary position sensor may be used to compute the locations of the subsurface and/or geophysical sensors in the first sensor cart and of a single point tow position for a ball hitch used to tow the second sensor cart. This single point tow position can then be used as a pseudo-position sensor to compute the locations of the subsurface and/or geophysical sensors on the second sensor cart. In this way, the positions of each subsurface and/or geophysical sensor in each sensor cart of a train of sensor carts can be measured with high accuracy using a single position sensor in one of the sensor carts.

Subsurface sensor data is acquired 106 from one or more sensors mounted to the cart. Useful sensors that may be used individually or, preferably, in combination include a ground penetrating radar sensor arrangement, an electromagnetic induction sensor arrangement, and a shallow application seismic sensor arrangement. Other sensors that can be deployed include one or more of a video or still camera, magnetic fields sensor arrangement (e.g., magnetometers), among others. Position data may be acquired for each of the various sensors in a manner consistent with the present invention.

The position data is associated with the subsurface sensor data acquired over the course of the survey path in a manner that accounts for dynamic motion of the platform. In this manner, the subsurface sensor data acquired over the course of the survey path is associated with geometrically correct position data, typically relative to a reference frame that may be local or global. An output of the associated position and sensor data is produced 109.

Other forms of information, such as manual survey data, field notes, and CAD features, may be acquired or otherwise associated with the subsurface sensor data. Each of these other information sources may include data that has associated positioning data obtained from a reliable source or highly accurate device (e.g., GPS sensor). Collection of subsurface survey data using a multiplicity of disparate sensors and positioning data for the sensors in this manner provides for geometrically true positioning and co-registration of sensor data and other forms of information or data, such as those discussed above. Highly accurate positioning and co-registration of all data sets is achieved through use of a unique mathematical model that accounts for dynamic motion of the sensor cart(s) and allows sensor position to be accurately determined as the sensor arrangement traverses a survey path.

Figure 7:
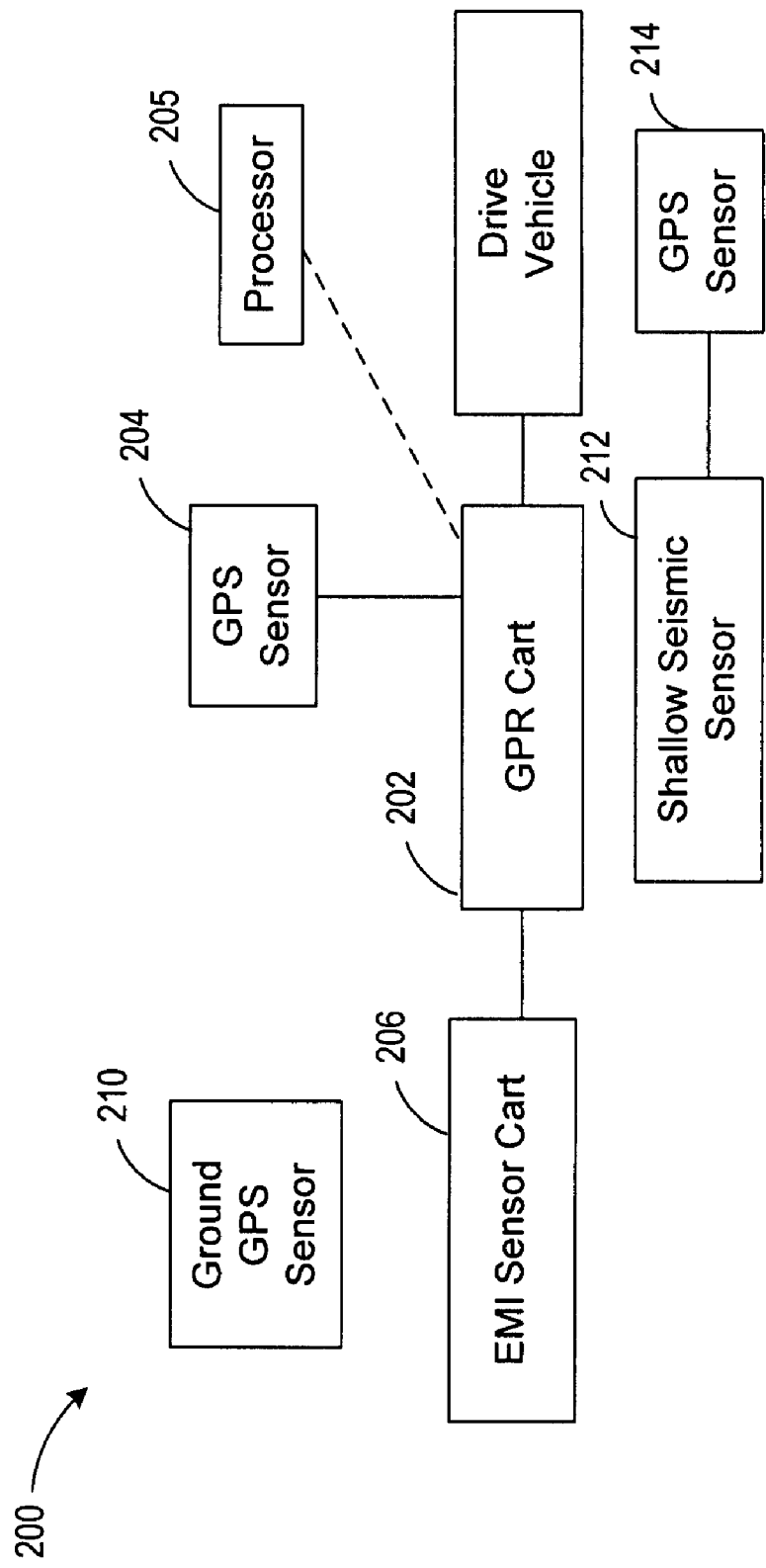
FIG. 7 is a block diagram of a sensor transport cart configuration which includes a drive vehicle and one or more carts for transporting one or more sensors configured to survey a subsurface and acquire sensor positioning data in accordance with embodiments of the present invention.

FIG. 7 is a block diagram of a typical sensor transport cart configuration 200, which includes a drive vehicle 208, such as a small tractor or ATV, to which is hitched a GPR cart 202. An EMI (electromagnetic imaging) sensor cart 206 is shown hitched to the GPR cart 202. A GPS sensor 204 is mounted on the GPR cart 202, at a location in front of or behind the GPR cart axle. A fixed ground GPS sensor or tracking system 210 is preferably used that cooperates with the GPS sensor 204 mounted to the GPR cart 202, although a laser position sensor and tracking system may be employed.

The configuration shown in FIG. 7 also includes a shallow application seismic sensor 212 and associated GPS sensor 214. The shallow application seismic sensor 212 is typically transported over the site separately from the EMI and GPR sensors, primarily due to the need to mechanically couple the seismic sensor 212 to the ground when performing seismic imaging of a subsurface. An exemplary seismic sensor 212 to use in the context of the present invention is disclosed in commonly owned co-pending U.S. Provisional Patent Application Ser. No. 60/789,698, filed on Apr. 6, 2006, which is hereby incorporated by reference.

As discussed previously, the position sensor 204 is preferably supported by the sensor cart 202 or 206 in a spaced-apart relationship relative to the sensor or sensors that are configured to acquire subsurface measurements. It is understood, however, that the cart dynamics model of the present invention that allows sensor position to be accurately determined as the sensor arrangement traverses a survey path may be employed for subsurface sensors that have an integrated position sensor. For example, the cart dynamics model of the present invention allows sensor position to be accurately determined in three dimensions (e.g., X and Y surface coordinates and an elevation coordinate, Z), irrespective of whether the subsurface sensing arrangement is mounted at the position sensor location or other location spaced apart from the position sensor location.

However, the cart dynamics model of the present invention finds particular applicability in survey system deployments that have two or more spaced-apart sensors or arrays of sensors and a single position sensor (or where the number of position sensors is less than the number of spaced-apart sensors). For example, highly accurate positioning data may be determined using a cart dynamics model of the present invention for a sensor arrangement that includes a multi-channel sensor arrangement.

An on-board or external processor 205 (e.g., PC or laptop) is preferably configured to associate (in real-time or in batch mode) position data with multiple channels of sensor data developed by the multi-channel sensor arrangement relative to a reference frame and in a manner that accounts for dynamic motion of the sensor cart. Typically, positioning and sensor data association is performed after completion of the survey of a desired site (i.e., after acquisition of the sensor data and positioning data).

The multi-channel sensor arrangement may include one or more of a multi-channel ground penetrating radar and a multi-unit electromagnetic imaging sensor. The sensor arrangement may also include a multiplicity of disparate sensors that provide disparate subsurface sensor data, and the processor may be configured to associate the disparate sensor data developed by the multiplicity of disparate sensors with geometrically correct position data relative to the reference frame. The disparate sensors may include two or more of a ground penetrating radar, an electromagnetic imaging sensor, and a shallow application seismic sensor.

Figure 8:
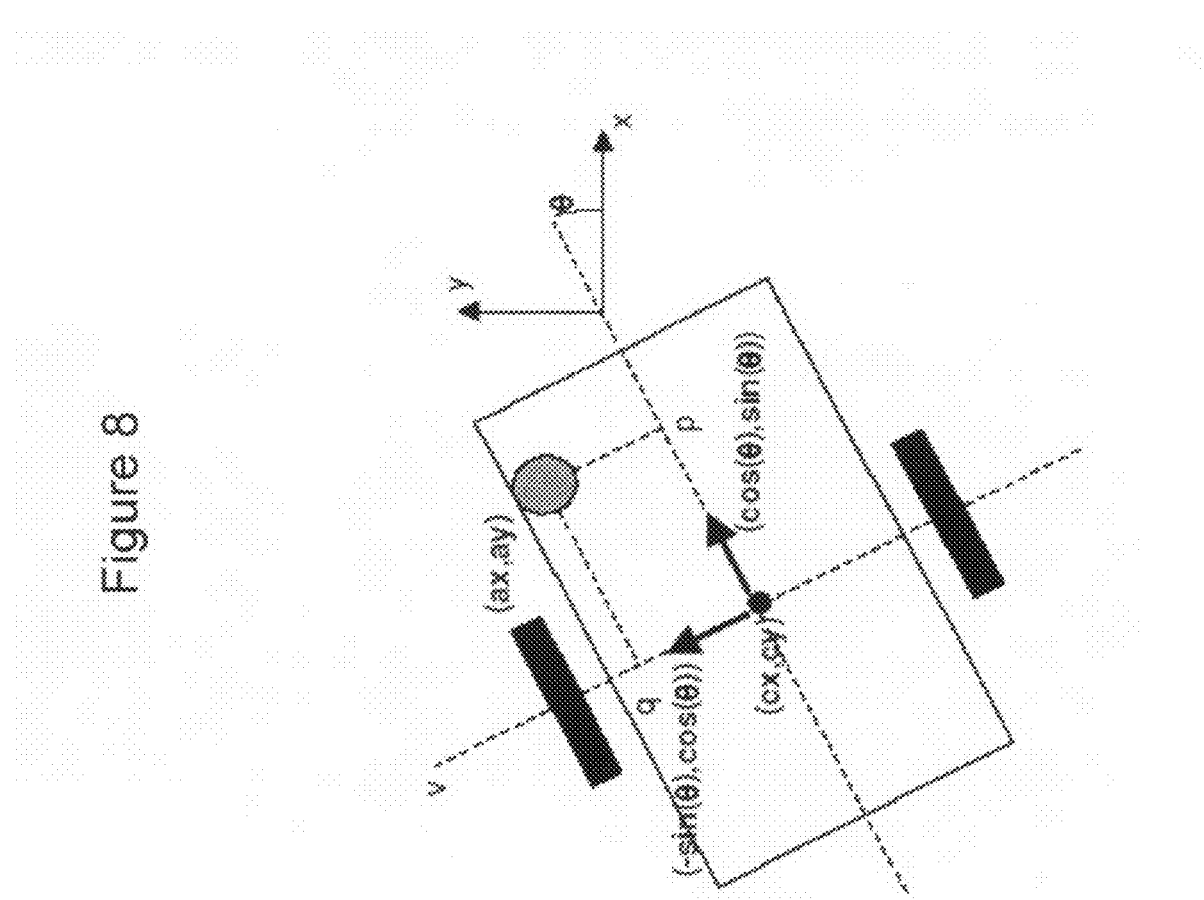
FIG. 8 shows various features of a sensor cart that includes a position sensor, such features impacting positioning data produced by a cart dynamics model in accordance with embodiments of the present invention.
Figures 9A, 9B:
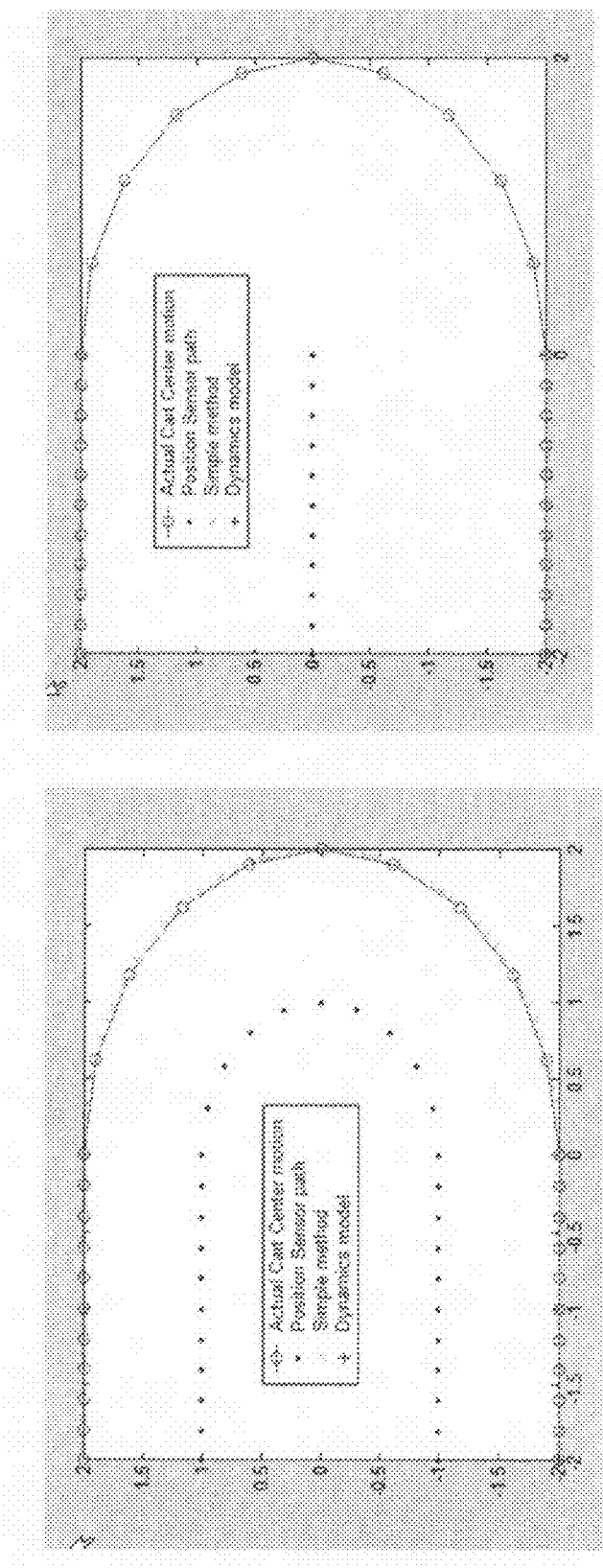
Figure 11A:
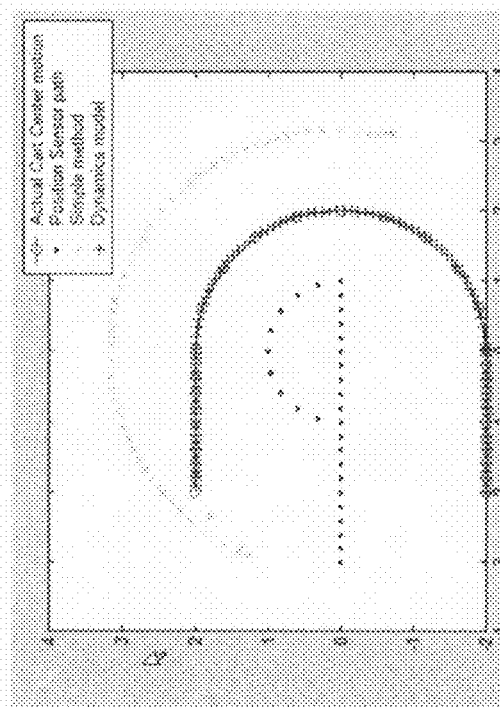
Figure 11B:
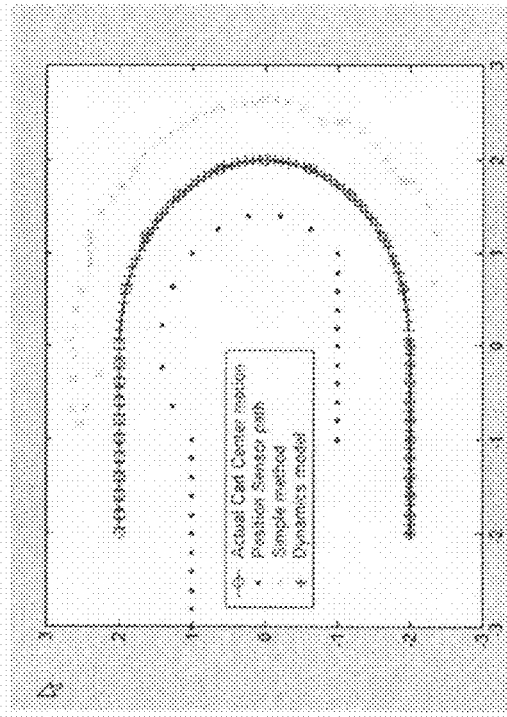

FIGS. 8-13 show various scenarios of a sensor cart that facilitate an understanding of a cart dynamics algorithm according to embodiments of the present invention. With reference to FIG. 8, let (x,y) be the global coordinate system. Let (u,v) be a local coordinate system for the cart. The cart geometry is defined by:

the center of the cart axle at (u,v)=(0,0), and the axle is parallel to the v-axis;
the GPS antenna is located at (u,v)=(p,q).

Suppose the global trajectory of the antenna is (ax(t), ay(t)). The cart trajectory is defined by the path of the cart center (cx(t), cy(t)) and the angle that the cart's u-axis makes relative to the global x-axis, θ(t). The motion of the cart is determined by two factors. Firstly, the antenna position can be calculated from the cart position and orientation:

$$\begin{pmatrix} ax \\ ay \end{pmatrix} = \begin{pmatrix} cx \\ cy \end{pmatrix} + \begin{pmatrix} \cos(\theta) & -\sin(\theta) \\ \sin(\theta) & \cos(\theta) \end{pmatrix} \begin{pmatrix} p \\ q \end{pmatrix}$$

Secondly, the cart center cannot move parallel to the axle—this involves the wheels sliding sideways—which translates to:

$$\begin{pmatrix} c\dot{x} \\ c\dot{y} \end{pmatrix} \cdot \begin{pmatrix} -\sin(\theta) \\ \cos(\theta) \end{pmatrix} = 0$$

Differentiating the first equation with respect to time and imposing the second condition yields a set of ordinary differential equations for the cart motion:

$$\dot{\theta} = \frac{1}{p} \begin{pmatrix} a\dot{x} \\ a\dot{y} \end{pmatrix} \cdot \begin{pmatrix} -\sin(\theta) \\ \cos(\theta) \end{pmatrix}$$

$$\begin{pmatrix} c\dot{x} \\ c\dot{y} \end{pmatrix} = \begin{pmatrix} a\dot{x} \\ a\dot{y} \end{pmatrix} - \begin{pmatrix} -\sin(\theta) & -\cos(\theta) \\ \cos(\theta) & -\sin(\theta) \end{pmatrix} \begin{pmatrix} p \\ q \end{pmatrix} \dot{\theta}$$

The antenna speed (aẋ,aẏ) can be calculated from a smooth (e.g., spline) fit to the discrete set of measured antenna positions and times. The initial cart position and orientation can be calculated by assuming that the cart's u-axis is parallel to the initial antenna speed, and then the differential equations above can be integrated (e.g., using a Runge-Kutta scheme) to give the cart trajectory.

Figures 12A, 12B:
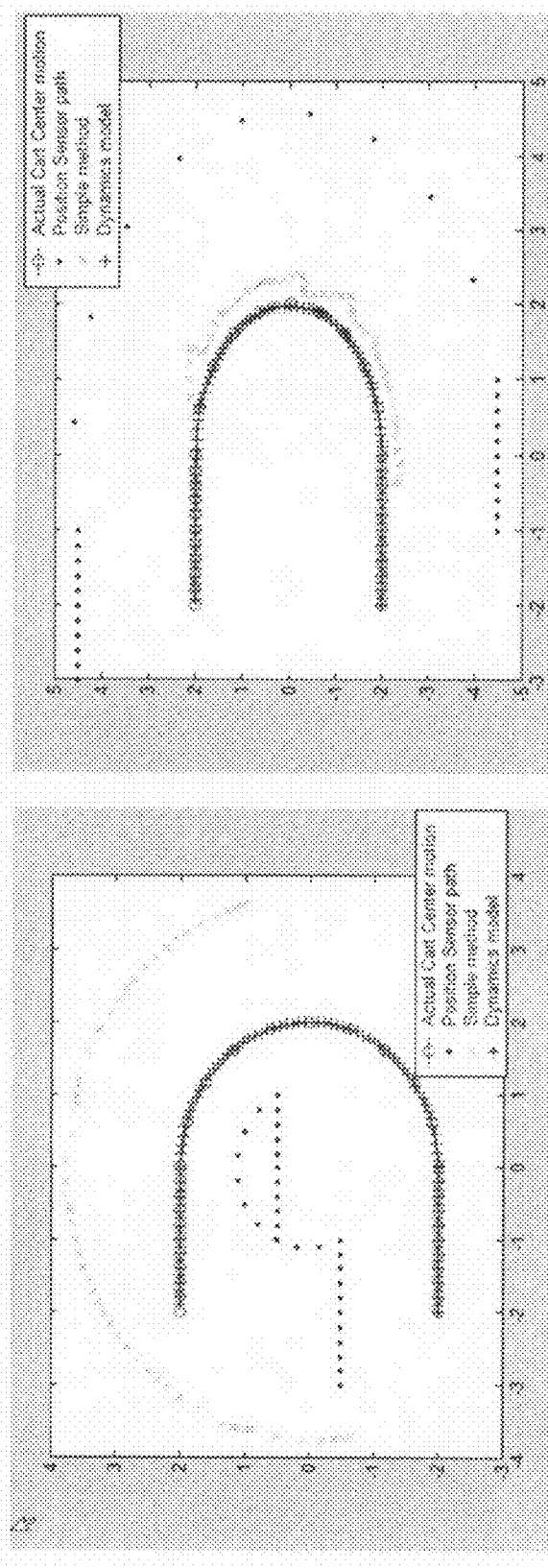
Figure 13:
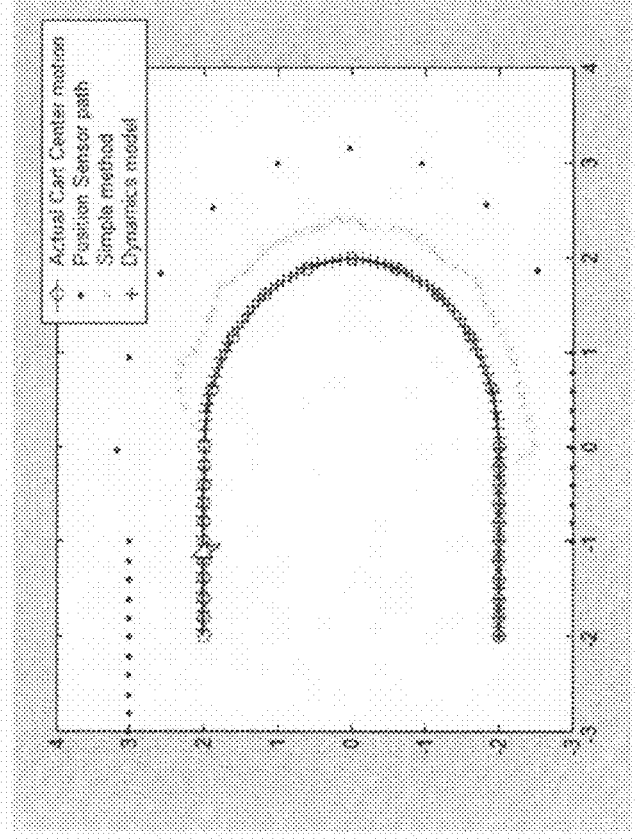

FIGS. 9A-13 show different scenarios for mounting the sensor relative to the axle of the cart. It has been determined that the position of the sensor relative to the axle dictates whether or not the dynamic is defined (i.e., valid) or becomes undefined (i.e., not valid). FIGS. 9A-10B demonstrate that the cart dynamics model becomes undefined when the position of the sensor (p) is on the axle (p=0). FIGS. 12A-13 demonstrate that the cart dynamics model is defined for sensor positions located ahead of the axle (i.e., p>0). Although not shown in these Figures, the cart dynamics model is also defined for sensor positions located in back of the axle (resulting in a simple change in the sign of the p term from positive to negative in the equations above).

FIGS. 12A-13 demonstrates that the dynamic model very accurately tracks the actual cart center motion when the sensor is positioned ahead of the axle. Conversely, FIGS. 12A-13 clearly demonstrate that the conventional simple "tangent" method poorly tracks the center of cart motion. Using a conventional simple tangent method, an error is unavoidable on any curve when the sensor is not positioned on the axle. This error on the curve grows larger as the distance between the axle and sensor position increases when using a conventional simple tangent method.

Figure 14:
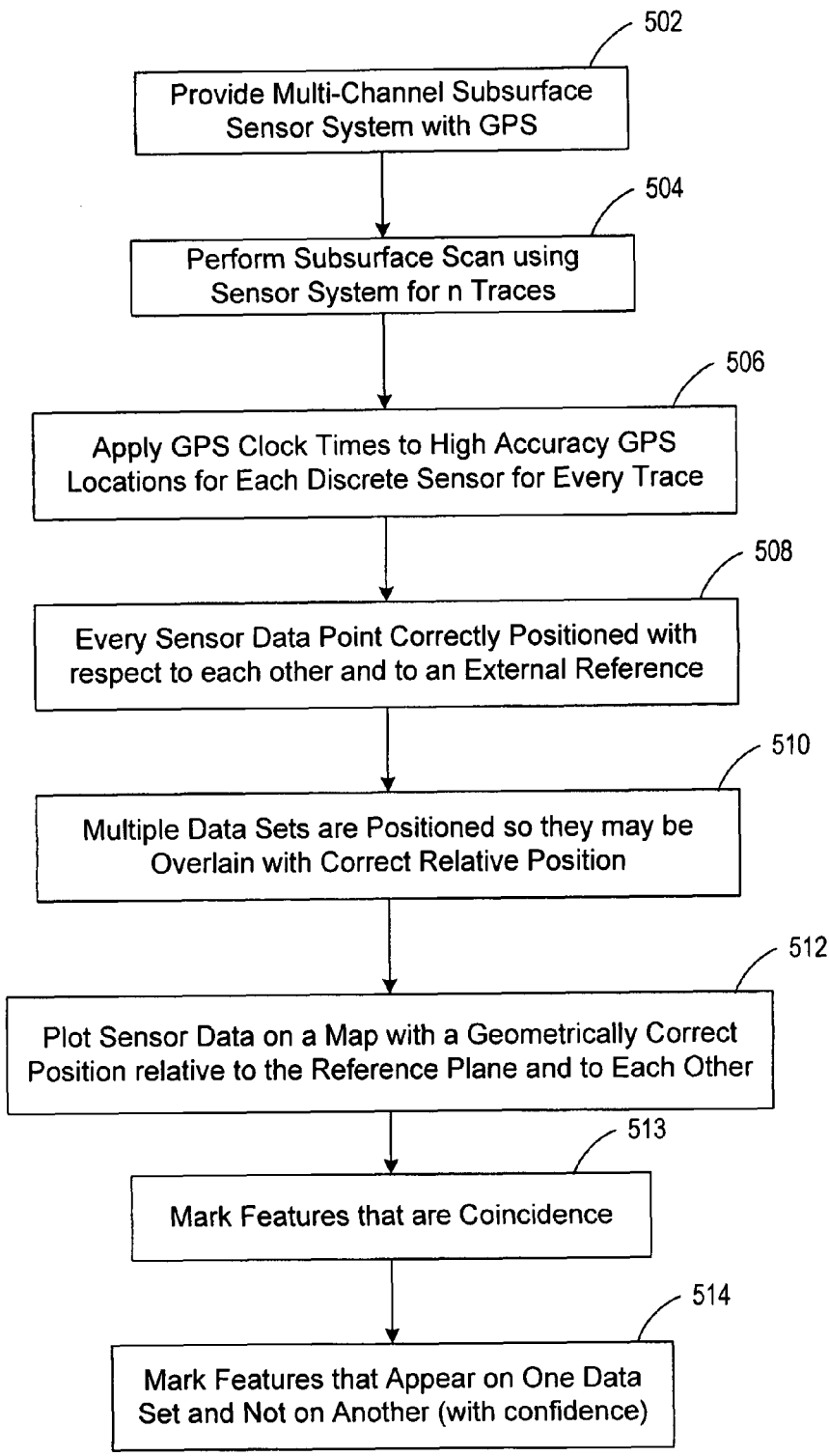
FIG. 14 is a flow chart of various processes associated with the acquisition and processing of position sensor data and data from one or more subsurface survey sensors in a manner consistent with a cart dynamics modeling approach in accordance with embodiments of the present invention.

FIG. 14 is a flow chart of various processes associated with the acquisition and processing of position sensor data and data from one or more subsurface survey sensors in a manner consistent with a cart dynamics modeling approach in accordance with embodiments of the present invention. A multi-channel subsurface sensor system is preferably provided with a GPS positioning capability 502, such as the system shown in FIG. 7, and is used to perform a subsurface scan 504 for n traces. GPS clock times are applied to high accuracy GPS locations for each discrete sensor for every trace 506.

Every sensor data point is correctly positioned with respect to each other and to an external reference 508. Multiple data sets are positioned so they may be overlain with correct relative position 510. Sensor data is plotted on a map with a geometrically correct position relative to the reference frame and the each other 512. Features are marked that are coincident 513. Features that appear on one data set but not on another are marked 514, and a confidence value may be applied to such marks.

Figure 15:
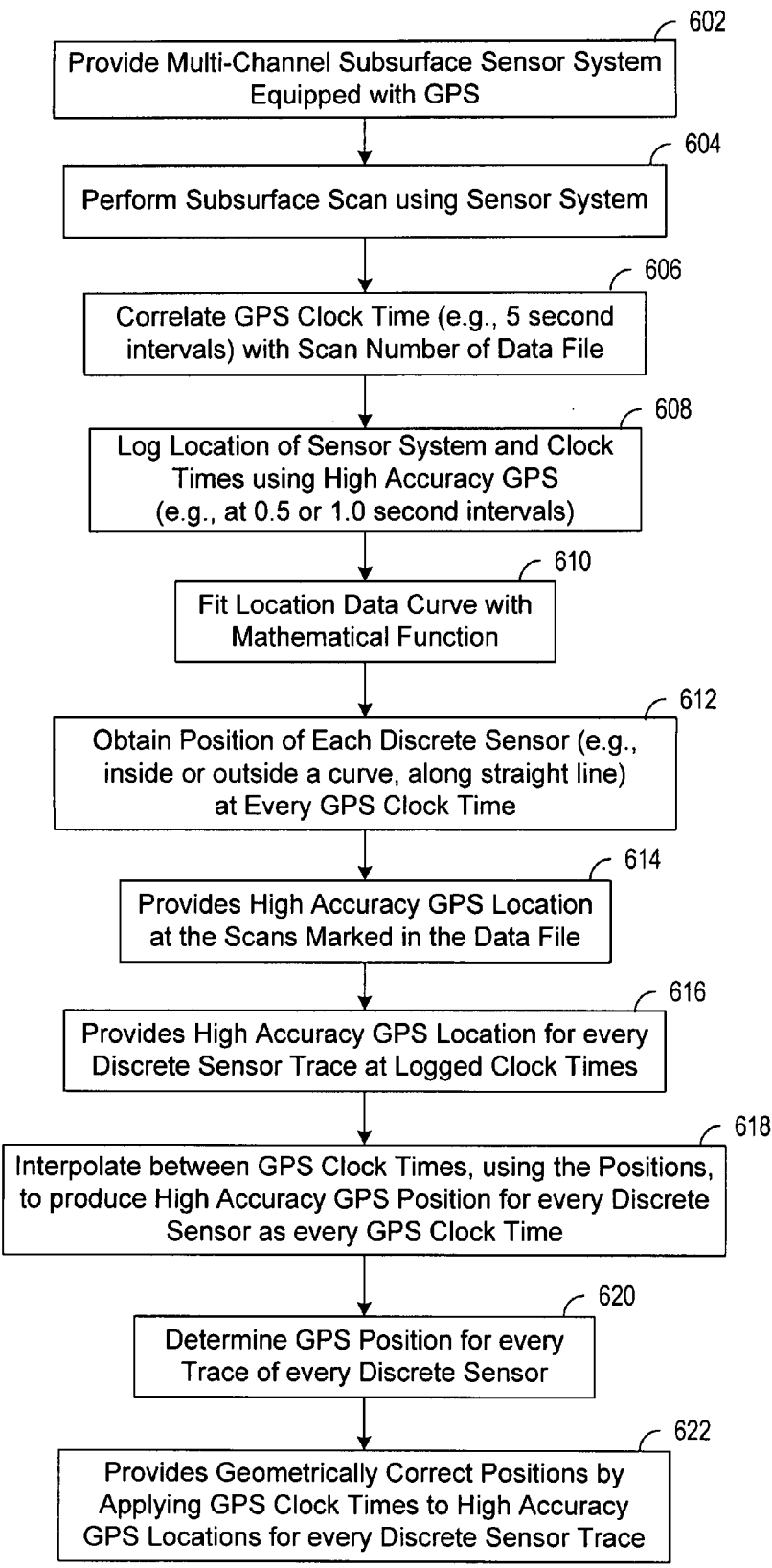
FIG. 15 is a flow chart of various processes associated with the acquisition and processing of position sensor data and data from one or more subsurface survey sensors in a manner consistent with a cart dynamics modeling approach in accordance with embodiments of the present invention.

FIG. 15 is a flow chart of various processes associated with the acquisition and processing of position sensor data and data from one or more subsurface survey sensors in a manner consistent with a cart dynamics modeling approach in accordance with embodiments of the present invention. A multi-channel subsurface sensor system equipped with a GPS positioning capability 602 is used to perform a subsurface scan 604. GPS clock times (e.g., 5 second intervals) are correlated with the scan number of the GPR data file 606. The location of the sensor system and clock times are logged using high accuracy GPS (e.g., at 0.5 or 1.0 second intervals) 608. A location data curve developed from the data is fitted with a mathematical function 610. The position of each discrete sensor, whether at an inside or outside curve location or straight line location, is obtained at every GPS clock time 612. The provides a high accuracy GPS location at the scans marked in the data file 614. This also provides a high accuracy GPS location for every discrete sensor trace at logged clock times 616.

Using the positions obtained in block 612, a high accuracy GPS position is obtained for every discrete sensor at every GPS clock time by interpolating between GPS clock times 618. The GPS position for every trace of every discrete sensor is determined 620. This process provides for geometrically correct positions by applying GPS clock times to high accuracy GPS locations for every discrete sensor trace 622.

It is understood that the clock times that are correlated with the scan number of the GPR data file or other sensor data file may be generated by appropriate clock sources other than a GPS source, such as an internal clock time of a computer or PC. It is further noted that the position sensor may be of a type different from a GPS sensor, such as a laser tracking sensor or system, and that clock times derived from an appropriate clock source may be applied to locations indicated by such other position sensor for each discrete sensor for every trace.

The "trueness" of the geometry that provides for geometrically correct positions for the various subsurface sensor data is based in part on supplying a geo-referenced position to each and every sensor trace, such as every GPR trace. According to one approach, a high stability, high accuracy GPS or other clock time is logged. This time is correlated with a scan number of the GPR data file. Also collected is high accuracy GPS other position sensor data at 0.5 or 1.0 second intervals. The location data curve is fit with a mathematical function, and the cart dynamics algorithm previously discussed is used to obtain the position of each antenna at every GPS clock time (or clock time from another suitable clock time source).

The dynamics of the sensor cart are tracked so that the location of the GPS antenna on the inside or outside of the curve can be determined, which is evident if the data points are compressed or rarified as the cart goes around a corner. A high accuracy GPS location or other suitably derived location is thus obtained for each antenna at all GPS clock times (or other device that provides clock times), thus providing a high accuracy position at the scans marked in the GPR data, and a high accuracy position for every antenna trace at these times. A processor then interpolates between the clock times, using the positions, to obtain a high accuracy position for every antenna, at every clock time. These data are used to obtain a position for every trace of every antenna, using the cart dynamics algorithm to compute the positions.

The geometrically correct positions are thus derived from applying clock times, such as GPS clock times, to high accuracy sensor derived locations (e.g., GPS locations), for every trace. This results in high accuracy positions for a 2D, irregular grid of the surface position of every trace. For example, if there are 3 swaths of 14 channels, over a length of 50 feet, at 1 scan per inch, a position file with the locations of 25,200 GPR traces is thus generated—all positioned correctly with respect to an external reference and to each other. The same calculations are made for every data point collected with the EMI sensor system, except that only a single scalar value is obtained rather than the 3D block with a depth that is obtained from the GPR sensor. The positioning algorithm applies to the EMI sensor data and to seismic sensor data, which is more like the GPR data.

By way of example, if an acre of data is obtained with a trace every 4 square inches, at total of 1,568,160 locations need to be managed. If one only surveys the start and end points and assumes a straight line, one essentially does the same calculation to again get the positions of the 25,200 traces, except that now the lines are straight and not potentially curved.

Every data point has now been positioned correctly with respect to each other and to an external reference, which may be an external reference in latitude and longitude format or in state plane coordinates, for example. The data may be plotted on a map on a graphical user interface with a geometrically correct position to the reference frame, and as importantly, to each other. Thus, multiple data sets are positioned so they may be overlain with the correct relative position, and features that are coincident may be marked, along with those that appear on one data set and not on another. This provides the user with confidence that one really can see features that appear on one data set and not on another. If there is uncertainty in the relative positions, the user would not know if the feature is seen on one sensor and not the other (i.e., 2 distinct features) or if they are the same feature but there has been a mis-location between the two data sets (1 distinct feature with relative mis-location).

A cart dynamics model of the present invention may be embodied in a variety of ways of varying complexity. For example, cart dynamics modeling software may be implemented by a processor of a movable survey system, such as those discussed above. Cart dynamics modeling software may also be implemented as part of a more comprehensive system, such as that illustrated in FIGS. 16, 20 and 21, for example, in which cart dynamics modeling occurs after completion of the survey. It is understood that the cart dynamics modeling approach of the present invention is not limited to application in the disclosed systems, by find applicability in a wide variety of implementations where accurate association of sensor data to sensing location is required, particularly where a multiplicity of disparate sensor data is to be co-registered.

Figure 16:
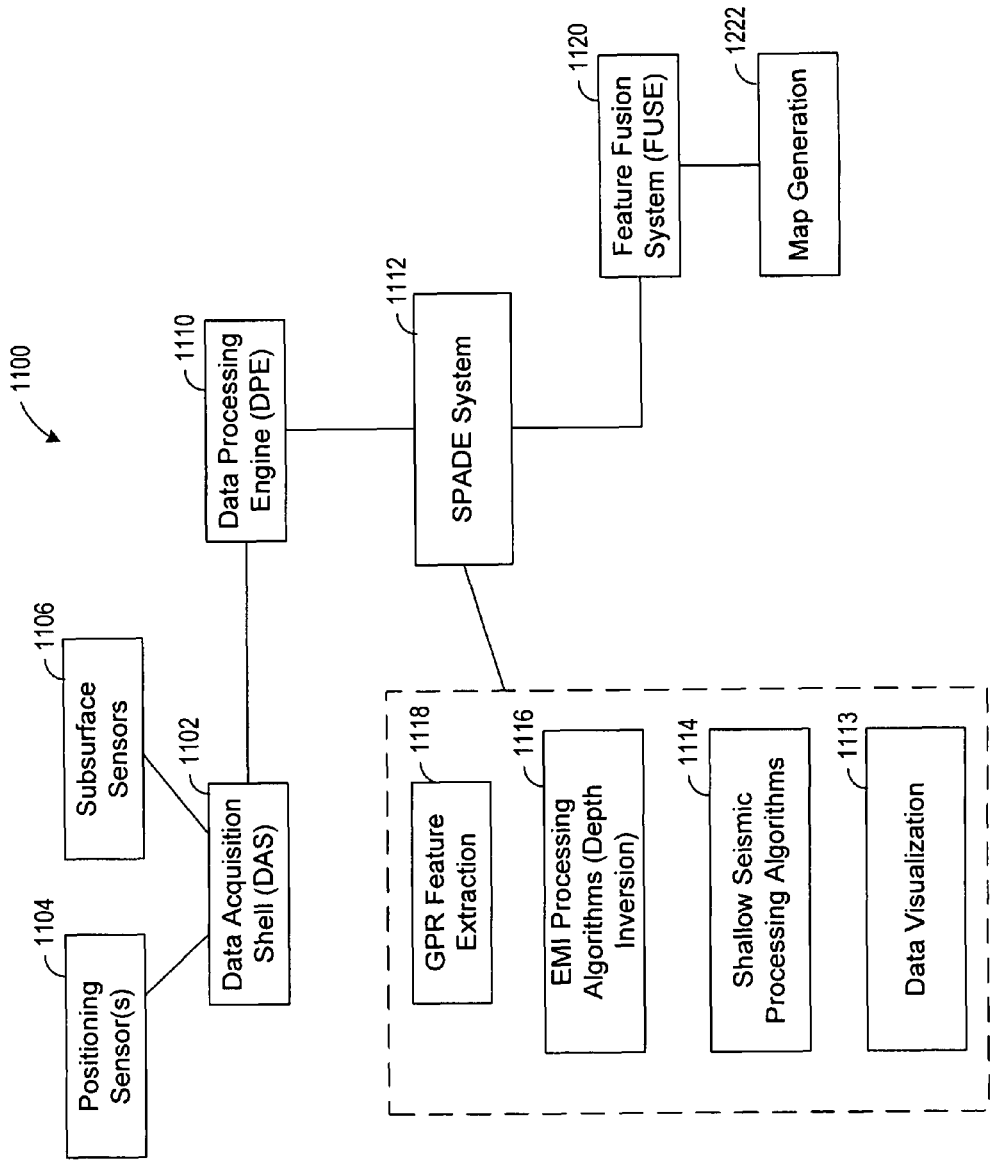
FIG. 16 is a block diagram of a system for evaluating a subsurface that implements cart dynamics modeling algorithms in accordance with embodiments of the present invention.

Referring now to FIG. 16, there is shown a system for evaluating a subsurface in accordance with embodiments of the present invention. The system 1100 includes a number of sub-systems that perform useful and unique functions. These sub-systems include a data acquisition shell (DAS) 1102, a data processing engine (DPE), a data visualization tool (SPADE system) 1112, and a feature fusion system (FUSE) 1120, which may include a map generation sub-system 1222. Each of these sub-systems embodies inventive features as stand-alone modules. Inventive features are also found by cooperation between two or more sub-systems. The following discussion concerning FIG. 16 is directed primarily to a data visualization tool, SPADE 1112, that facilitates implementation of a cart dynamics modeling technique of the present invention.

As is shown in FIG. 16, DAS 1102 receives data acquired from one or more position sensors 1104 and two or more subsurface imaging or detection sensors 1106. Typical position sensors 1104 include mobile and fixed GPS sensors, and a position sensor. Typical sensors 1106 include GPR (e.g., 14 channel GPR), multi-unit electromagnetic imaging (EMI) sensor, and a high frequency shallow application seismic sensor. It is understood that other geophysical or subsurface sensors may be employed to facilitate subsurface and soil geology/soil mechanics evaluation, including a multiple-unit magnetic field sensor, resistivity sensor, gravity sensor, for example. Data from such other sensors may also be ported to DAS 102, and that such data may also be tagged with positioning data.

DAS 1102 operates as an umbrella or shell for the various sensors 1104, 1106. DAS 1102 provides a number of functions, including navigation of a site. In a typical system deployment, DAS 1102 may receive multiple GPS sensor data, multiple (e.g., three) EMI sensor data, GPR sensor positioning data, EMI sensor positioning data, and position sensor data. In this regard, DAS 1102 collects separate, asynchronous data streams for the various subsurface imaging or detection sensors 1106 and position sensor 1104, such as one or more GPS sensors. DAS 1102 may also be configured to implement a cart dynamics algorithm and provides very accurate positioning and co-registration of all data sets, thus allowing for alignment of such data for presentation in true geometry. DAS 1102 also provides for EMI sensor calibration and survey control, a battery monitor, remote sensor evaluation, preliminary sensor data processing, and a full on-line help facility.

Figure 17:
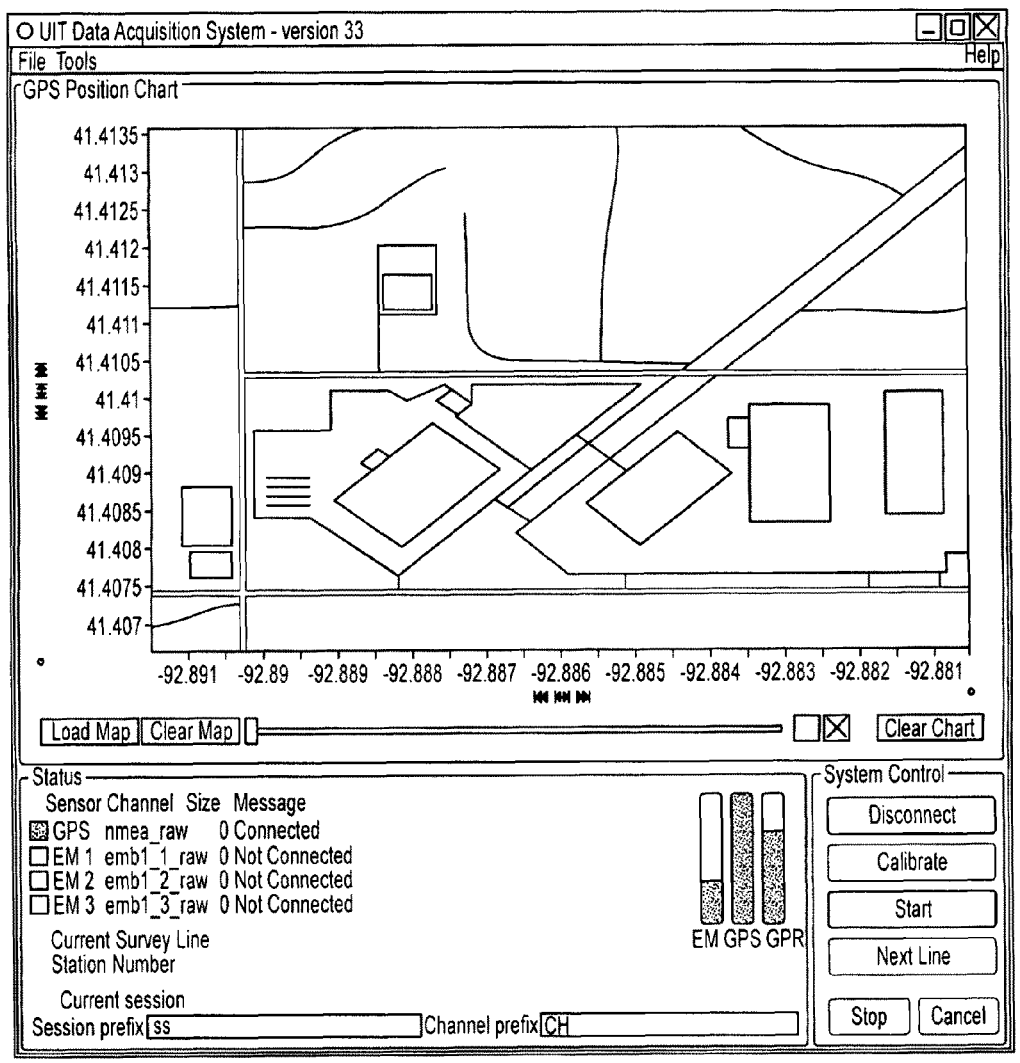
FIGS. 17 and 18 show screen images provided to a user via a graphical user interface of a system for evaluating a subsurface that implements cart dynamics modeling algorithms in accordance with embodiments of the present invention.
Figure 18:
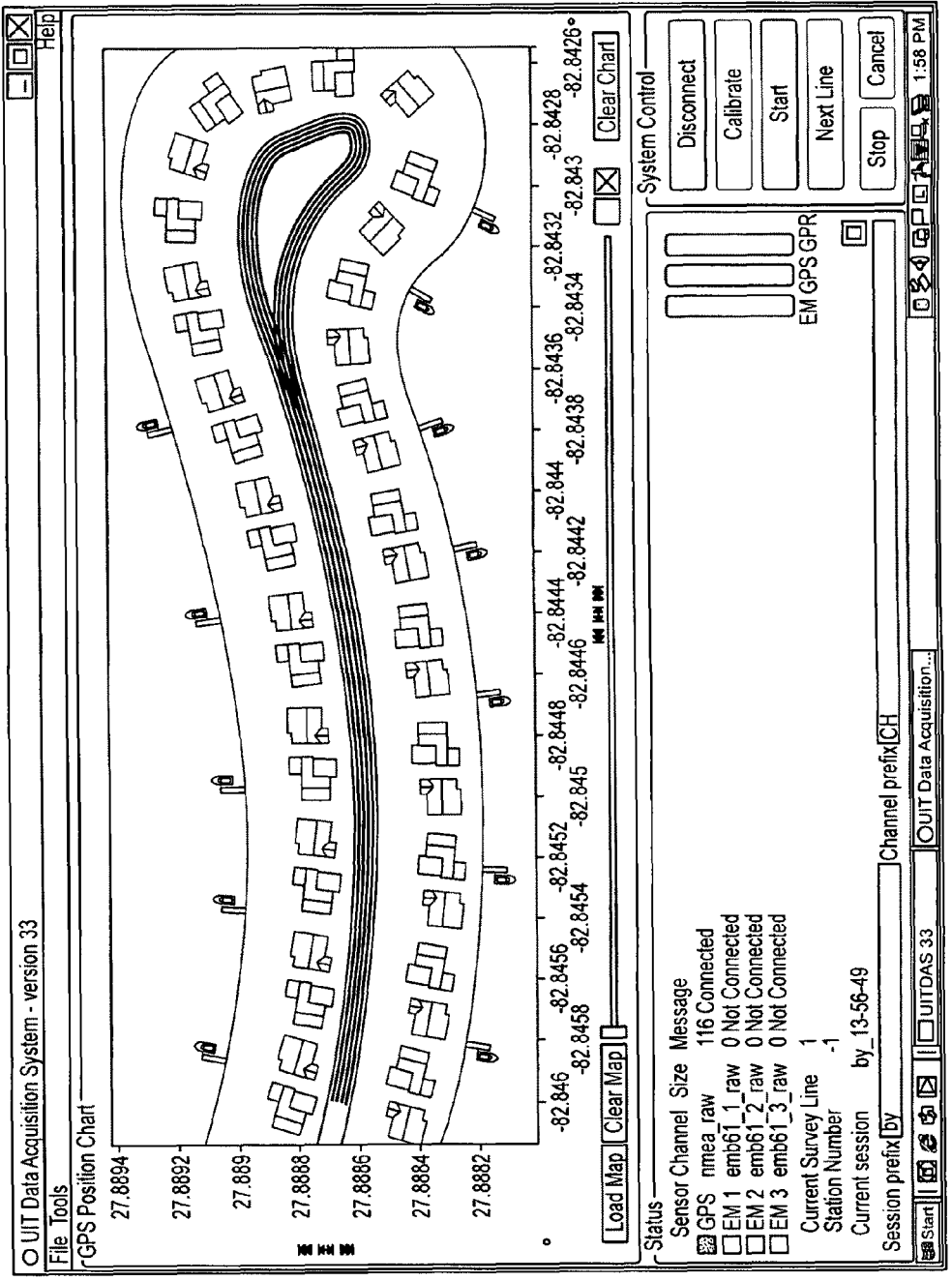

FIGS. 17 and 18 show screen images provided to a user via a graphical user interface (GUI) of DAS 1102. FIGS. 17 and 18 show aerial views of different sites imported to DAS 1102, with GPS position markers for the site indicated along the X and Y axes. Tracks of GPS acquired for the site shown in FIG. 18 are plotted along a curved residential street. A variety of maps may be imported into DAS 1102, including aerial, satellite, topographical, cultural, utility, structural, or any other map type (or combination of same) providing information of importance to the survey. Battery status of the various sensors, including EMI, GPR, GPS, and high frequency seismic sensors, for example, may be provided in the GUI of DAS 1102.

Figure 19:
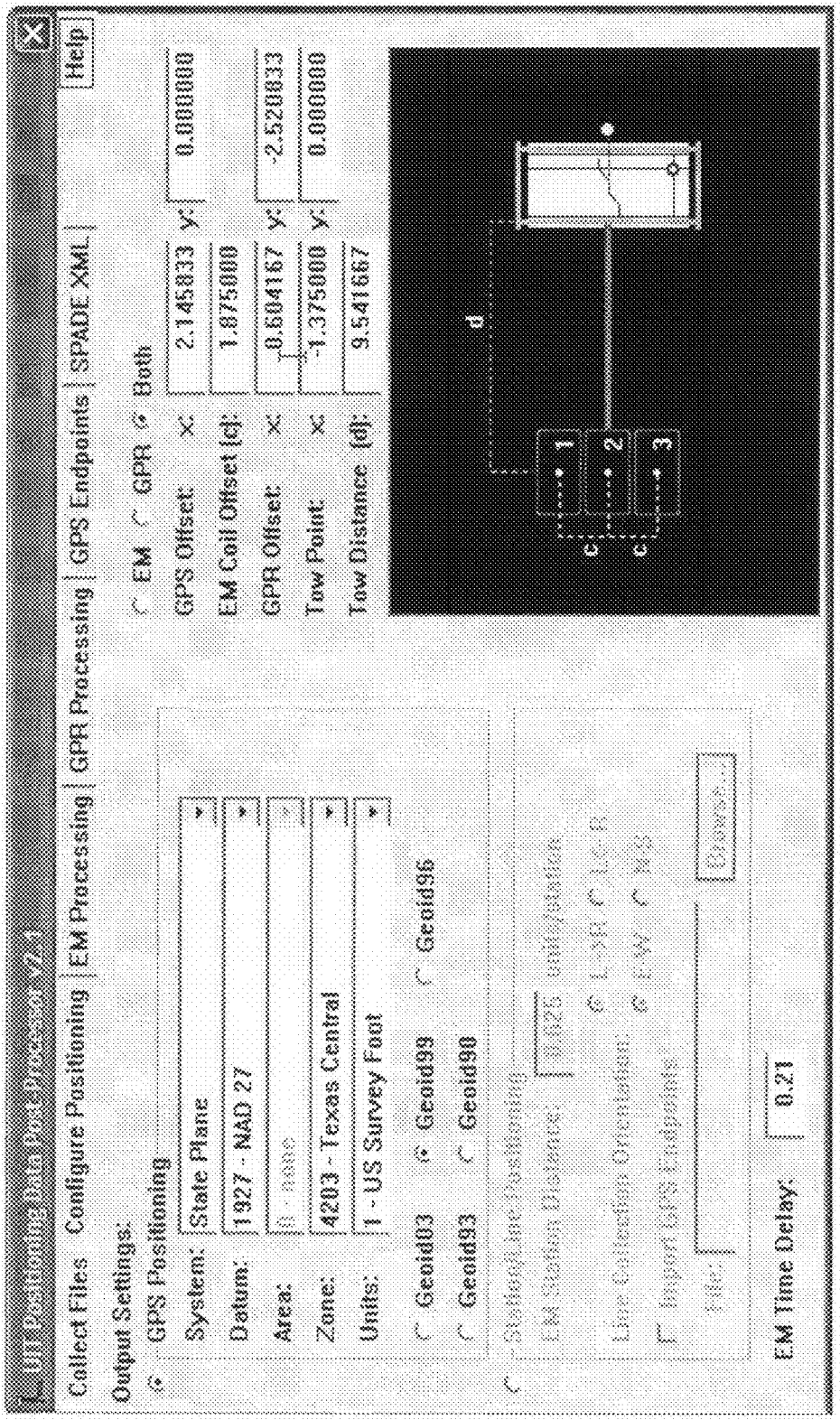
FIG. 19 shows a screen image provided to a user via a graphical user interface of a system for evaluating a subsurface that implements cart dynamics modeling algorithms in accordance with embodiments of the present invention.

FIG. 19 shows a screen image provided to a user via a GUI of data processing engine 1110. DPE 1110 performs a number of operations on the data received from DAS 1102 and other data. DPE 1110, for example, performs sorting of EMI sensor data received from DAS 1102, and handles GPS to UTM or State Plane conversion. DPE 1110 also sorts GPR sensor and positioning data received from the GPR sensor and GPS sensor associated with the GPR sensor. This sorting entails merging all sensor data sets into a single file with all data points correctly associated with a position. These positions may be in any of a plurality of global reference frames, depending upon the requirements of the individual survey.

As can be seen in FIG. 19, configuration parameters associated with a cart that is used to transport the various sensors at a site may be established by the user. The cart configuration screen shown in FIG. 19 allows the user to set up the geometry of the sensors of the sensor carts relative to the position of the antenna of the GPS sensor, such as GPS sensor 1204 shown in FIG. 7. The values of X and Y offsets of the GPR and EMI sensors relative to the antenna position may be input. Values for the tow point and tow distance may also be input. A cart dynamics algorithm of the present invention uses the sensor geometry parameters shown in FIG. 19 to very accurately determine the position of each sensor relative to a single reference (e.g., a single GPS antenna). Using this approach, the cumulative errors that can occur when using a conventional "tangent" method are altogether avoided. It is noted that such errors can be 1 or several meters, particularly when the cart is navigating curves. Such errors may be acceptable is some applications, but may be wholly unacceptable in others.

Returning to FIG. 16, DPE 1110 creates files for direct import to the SPADE system 1112. DPE 1110 has the capability to handle multiple positioning scenarios, including full GPS, GPS end points, surveyed end points, straight lines, and curved lines. A full on-line help facility for DPE 1110 is available to the user.

SPADE 1112 provides a number of capabilities, including feature extraction 1118, EMI sensor data processing 1116 (e.g., inversion of EMI sensor data for depth computations), shallow application seismic sensor data processing 1114, and a variety of data visualization capabilities 1113. SPADE 1112 also provides for the import/input of field notes, context notes, and cultural features (and any related positioning data) concerning the site. A feature fusion system 1120 provides for feature fusion, confidence measure, and mapping functions. This data fusion function takes the features identified in SPADE 1112 by the separate sensor platforms, and performs a data fusion function. Thus, the product of this step is a fused set of feature locations and identifiers, each with a higher confidence of detection probability than any sensor used alone. The point of this step is to provide a map with higher probability of detection and lower false alarm rates than is possible if any single sensor were used independently.

Figure 20:
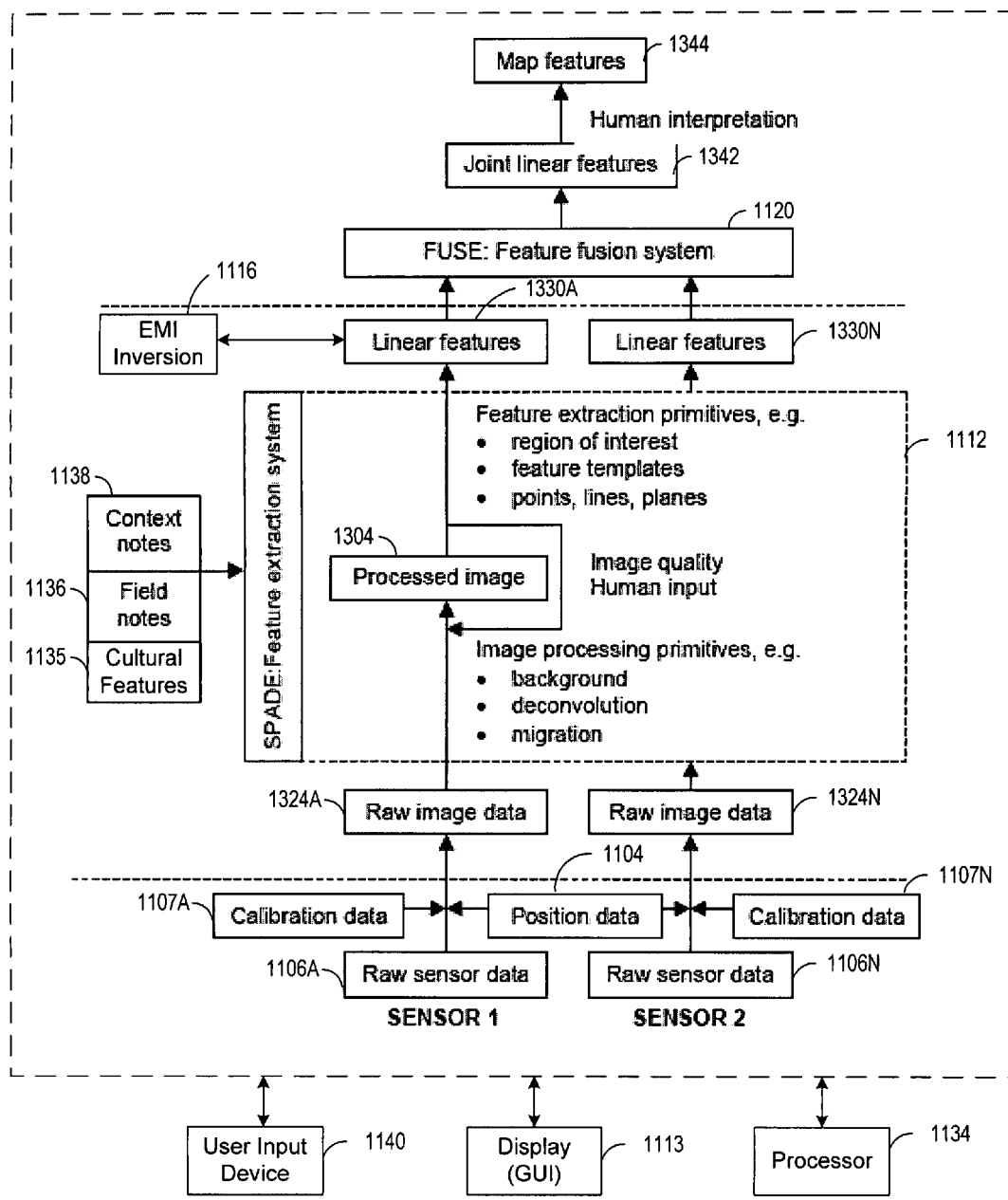
FIG. 20 shows details of a system for evaluating a subsurface that implements cart dynamics modeling algorithms in accordance with embodiments of the present invention.

FIG. 20 shows additional details of SPADE 1112 in accordance with embodiments of the present invention. As is shown in FIG. 20, SPADE functionality may be implemented using a processor 1134 coupled to a display 1113 that supports a GUI for SPADE 1112. A user input device 1140 (e.g., keyboard, mouse, trackball, touch stylus for a touch sensitive display, microphone for voice activated I/O) is also coupled to the processor 1134 to facilitate user interaction with SPADE 1112.

Raw sensor data is acquired by a number of sensors 1106A-1106N, such as those described above. The raw sensor data, any associated calibration data 1107A-1107N, and position data 1104 for each of the sensor 1106A-1106N is processed to form raw image data 1324A-1324N for each of the raw sensor data sets. The processing of raw sensor data 1106A-1106N, calibration data 1107A-1107N, position data 1104 and raw image data may be handled by DAS 1102 and DPE 1110 discussed above with reference to FIG. 16. Also, the position data 1104 associated with each sensor 1106A-1106N may be acquired using a position sensor dedicated to each sensor or a position sensor common to two or more sensors. For example, high accuracy GPS position data may be acquired for two or more sensors (e.g., GPR and EMI sensors) in accordance with a cart dynamics algorithm of the present invention.

The raw image data 1324A-1324N is ported to SPADE 1112. For GPR sensor data, the raw image data may include a file of GPR sensor data plus a text file giving the global (X,Y) coordinates for each scan and channel. For EMI sensor data, the raw image data may include a text file giving, for each coil at each station, the global (X,Y) coordinates of the coil and EMI sensor data for the various time gates. For seismic sensor data, the raw image data may include a file of seismic sensor data plus a text file giving the global (X,Y) coordinates for each scan and channel. This makes SPADE 1112 independent of how the various sensor data was collected. SPADE 1112 may also receive context notes 1138, field notes 1136, and cultural feature data 1135 for a user input device 1140 or via an interface to an external system (e.g., text files). SPADE 1112 may also export various data, including features, as a text file, and images, such as in an internal Matlab or other format.

According to one embodiment, a typical GPR data set may include a GPR data file and a mapping data file, which is a text file containing the global (X,Y) coordinates of each scan and channel in the GPR data file. One possible format for the mapping data file is:

Line 1 contains #channels=C, #scans=N;
Line i+1 contains $X(i,1), Y(i,1), X(i,2), Y(i,2), \ldots X(i,C), Y(i,C)$, where $X(i,j)$ is the X coordinate of the i-th scan and j-th channel, and $Y(i,k)$ is the corresponding Y coordinate.

To import the GPR data set, the user is prompted to specify:
The name of the GPR data file and mapping data file;
The number of time samples per scan (e.g., default may be 512) and channels (e.g., default may be 14);
The vertical distance between consecutive time samples in a scan;
A name for the Matlab or other application variable that will store the 3D image.

If more that one file is selected for import, SPADE 112 merges the corresponding 3D images into a single image by resampling the GPR data onto a regular (X,Y) grid. The orientation of the grid with respect to the (X,Y) axes and the spacing of the grid is determined automatically. The resampling process uses a nearest neighbor algorithm, and where images overlap, the later images in the sequence overwrite the earlier images. Regions in the combined image not covered by an input image have data values set to zero.

For EMI sensor data, this data is provided as a text file. One possible format is:
The first line contains #coils-C, #time gates=G, #scans=N;

Each subsequent line contains X,Y,V(1), . . . V(G), where X,Y are global coordinates of a coil and V(1), . . . V(G) are the signals obtained by that coil at each time gate.

Apart from the first line, the data can appear in any order in the file. For example, there is no need for a particular ordering by coil or by scan. There is no requirement for the X,Y coordinates to follow any geometric pattern. If multiple EMI files are selected for import, the corresponding data sets are simply concatenated together to make a single data set.

Field notes may be stored in an XML format, for example. Each field note may contain the following data:

Identifier: a short text string that uniquely identifies the field note;

Physical type: a text string, selected from a set of possible strings, that could be used by SPADE 1112 to provide for automated feature extraction (e.g., manhole, wire drop, sewer drain, etc.);

Display type: a text string, selected from a set of possible strings, that determines how the field note is displayed in the SPADE GUI (e.g., water, electricity, gas);

Polyline: an Nx3 array of numerical values, where each row gives the global X,Y,Z coordinates of a point in a polyline that describes the geometry of the filed note object;

Annotation: a text string that is displayed to the user in the SPADE GUI (e.g., for navigational purposes).

Features can be imported or exported either in DXF or XML format. In DXF format, each feature is represented by a polyline. In the XML format, each feature contains the following data:

Polyline: an Nx3 array of numerical values, where each row gives the global X,Y,Z coordinates of a point in a polyline that describes the geometry of the feature;

Source: a text string, selected from a set of possible strings, to indicate the source of the feature (e.g., user, RADAN, Surfer, SPADE 1112, or other source);

Explanation: a text string that can be used to assist the feature fusion process performed by FUSE 1120.

When a DXF file is imported, the user is prompted to specify a Source and Explanation that will be applied to all the features in the file.

SPADE 1112 operates on the raw image data 1324A-1324N to extract features of interest. Typical features include utilities, trenches, archeological or forensic objects, geologic boundaries or items of interest, items in road analysis such as delaminations, roadbed boundaries, rebar locations, etc. Features are any item that give rise to a geophysical signature that is of interest to the survey, client or interpreter. Features may be identified via SPADE generated image processing primitives (IPPs) and feature extraction primitives (FEPs) for GPR and EMI sensor data, for example. Examples of FEPs may include a region of interest, feature templates, points, lines, and planes. IPPs of interest may be identified by use of background removal, deconvolution, and migration. Features may also be entered in an external file that is imported into SPADE 1112, and then displayed or visualized within the SPADE GUI for further evaluation. A user may also participate actively in the production of a processed image 1304 via SPADE 1112.

For each sensor data set 1324A-1324N, SPADE 1112 identifies linear features 1330A-1330N. Inversion of EMI data may be performed 1116 to obtain depth data for identified features. The linear feature output data produced by SPADE 1112 may be ported to FUSE 1120, which may perform a feature fusion operation on this data. Joint linear features 1342 may be identified, which may involve user interpretation. Features identified by SPADE 1112 may be mapped 1344 by FUSE 1120.

Figure 21:
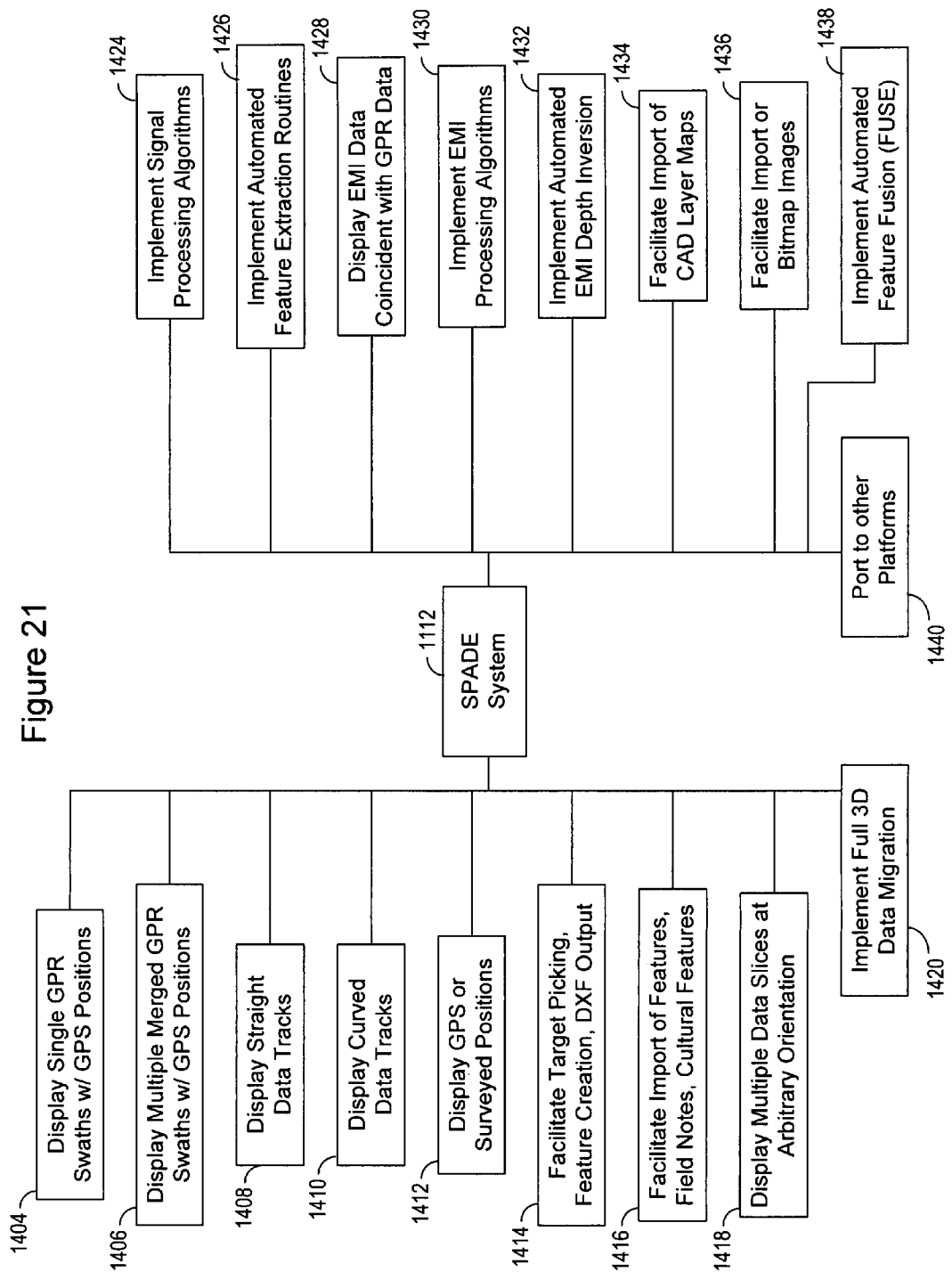
FIG. 21 shows details of a system for evaluating a subsurface that implements cart dynamics modeling algorithms in accordance with embodiments of the present invention.

FIG. 21 shows additional features of SPADE 1112 and various data visualizations produced by the SPADE GUI that provide for very accurate positioning and co-registration of all data sets, achieved in part through use of a cart dynamics model of the present invention that allows sensor position to be accurately determined as the sensor arrangement traverses a survey path. SPADE 1112 can be configured to display single GPR swaths with GPS positions 1404 or display multiple merged GPR swaths with GPS positions 1406. SPADE 1112 can be also configured to display straight data tracks 1408, curved data tracks 1410, and GPS or surveyed positions 1412. SPADE 1112 can be configured to facilitate target picking, feature creation, and provide DXF output 1414, as previously discussed. Also, as previously discussed, SPADE 1112 can be configured to facilitate import of features, field notes, context notes, and cultural features 1416.

SPADE 1112 can be configured to display multiple data slices at arbitrary orientations 1418. SPADE 1112 can be configured to implement various signal processing algorithms 1424 and automated feature extraction routines 1426. SPADE 1112 can be configured to display EMI data coincident with GPR data 1428 (and further with seismic data). Various EMI processing algorithms may be implemented 1430 by SPADE 1112, including automated EMI depth inversion 1432. SPADE 1112 can be configured to facilitate import of CAD layer maps 1434 and import of bitmap images 1436. SPADE 1112 can also be configured to implement automated feature fusion via FUSE 1120. SPADE 1112 may be implemented using Matlab (e.g., Matlab version 7), as in the embodiment described hereinbelow, or in other platforms, such as VTK, C++, Java or other platforms.

Figure 22:
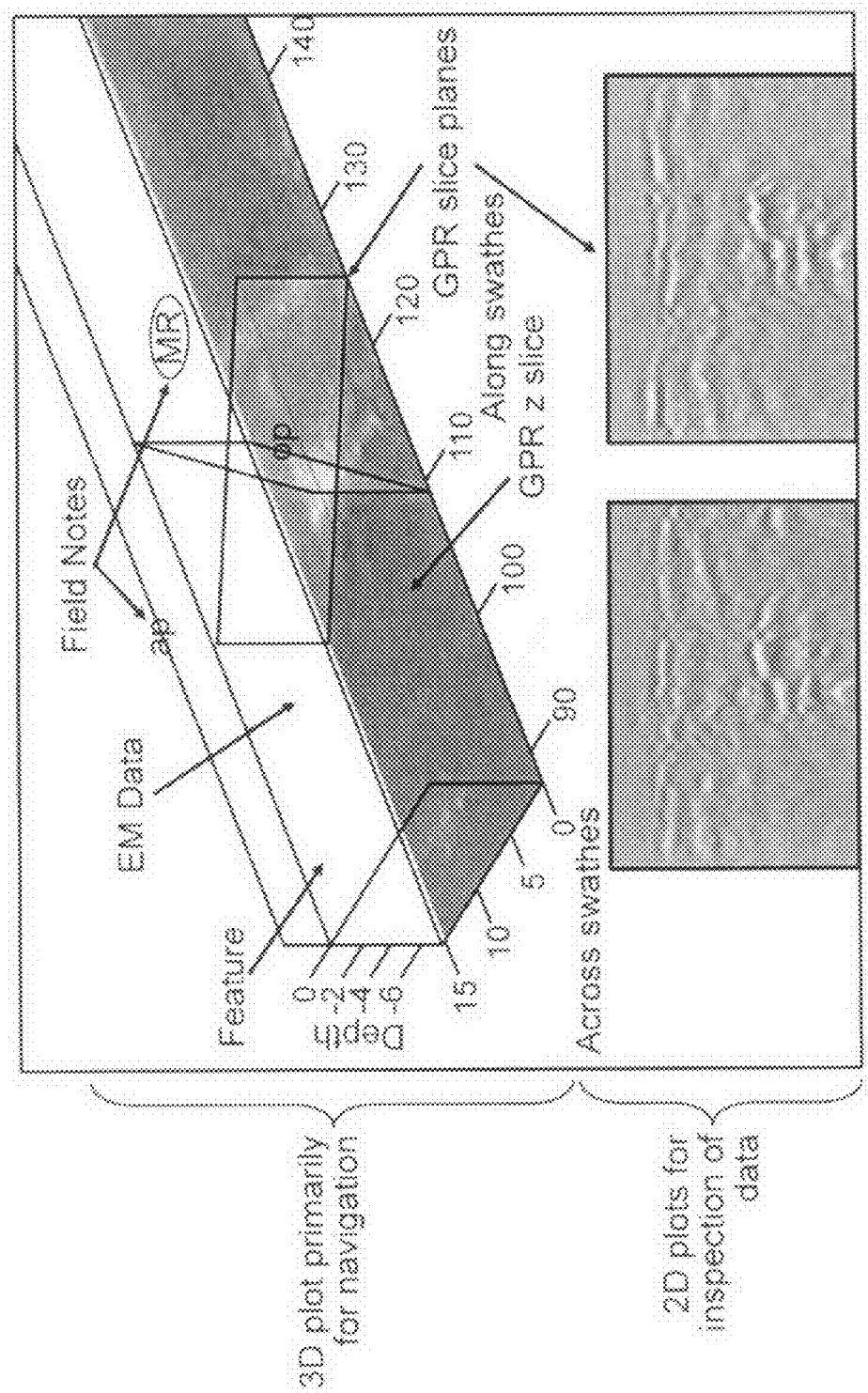
FIG. 22 shows an image of a graphical user interface screen that provide an accurate and efficient visualization of overlaid sensor data, positioning, field and context notes, and feature data on a single screen for a selected subsurface volume that is implemented using cart dynamics modeling algorithms in accordance with embodiments of the present invention.

Turning now to FIG. 22, there is shown an image of a GUI screen for SPADE 1112 that may be made available to the user. The GUI screen shown in FIG. 22 provides an accurate and efficient visualization (2D and 3D) of overlaid sensor data, positioning, field and context notes, and feature data on a single screen for a selected subsurface volume heretofore unavailable using conventional systems and approaches. According to one embodiment, the SPADE GUI is implemented as a standard Matlab figure window. This automatically provides a wide range of functions, such as the ability to save and export the figure window, navigation of 2D and 3D plots (pan, zoom, rotate, etc.), control of properties of graphics objects (colors, markers, line styles, etc.), and add annotations, axis labels, legends, etc.

The main components of the SPADE GUI shown in FIG. 22 include a menu for selecting various operations (e.g., data import, export, etc.). The GUI also includes an object list, which contains a list of the objects that SPADE 1112 can manipulate (images, field notes, features, etc.) and allows the display of those objects in the 3D plot to be configured. The GUI further includes the 3D plot, which is intended for overall navigation of the data. The GUI also includes two or three 2D plots, each of which can show one or any of the 2D image objects in the system, and which are intended for detailed inspection of the data. A set of button are also provided that enable various means for interacting with the 2D and 3D plots using the mouse or other input device. A command line textbox is also provided for executing Matlab or other software enabled commands.

Additional details of systems that incorporate SPADE and a cart dynamics modeling approach as described hereinabove are disclosed in co-pending U.S. Publication No. 2008/0079723, which is incorporated herein by reference. Moreover, known systems and methods that provide for subsurface surveying that utilize a more conventional "tangent" positioning technique may benefit significantly from the improved accuracy of sensor positioning realizable by incorporating a cart dynamics modeling approach of the present invention, such as that disclosed in U.S. Pat. No. 6,766,253, which is incorporated herein by reference.

Various modifications and additions can be made to the preferred embodiments discussed hereinabove without departing from the scope of the present invention. For example, the cart dynamics algorithm described hereinabove assumes presence of an axle that supports wheels. It is understood that the sensor cart may have arrangements other than wheels, such a tracks or runners. Moreover, sensor carts having multiple axles may be used. Accordingly, the scope of the present invention should not be limited by the particular embodiments described above, but should be defined only by the claims set forth below and equivalents thereof.

What is claimed is:

1. An apparatus, comprising:
 a movable platform having a front end, a back end, a longitudinal axis, and at least one axle oriented generally transverse to the longitudinal axis and located between the front and back ends for supporting wheels of the platform;
 a position sensor affixed on the platform at a location other than at a location defined by a plane passing through the at least one axle and normal to the longitudinal axis, the position sensor providing position data as the platform traverses a path;
 a sensor arrangement supported by the platform and configured to provide subsurface sensor data as the platform traverses the path; and
 a processor configured to associate the position data with the sensor data relative to a reference frame and in a manner that accounts for curvilinear dynamic motion of the platform.

2. The apparatus of claim 1, wherein the processor is configured to associate the position data with the sensor data relative to the reference frame and in a manner that accounts for velocity and orientation of the platform.

3. The apparatus of claim 1, wherein the processor is configured to associate geometrically correct position data with the sensor data relative to the reference frame.

4. The apparatus of claim 1, wherein the reference frame is a local reference frame or a global reference frame.

5. The apparatus of claim 1, wherein the sensor arrangement is supported by the platform in a spaced-apart relationship relative to the position sensor.

6. The apparatus of claim 1, wherein the sensor arrangement comprises at least one of a ground penetrating radar, an electromagnetic imaging sensor, and a shallow application seismic sensor.

7. The apparatus of claim 1, wherein the sensor arrangement comprises a multi-channel sensor arrangement, and the processor is configured to associate the position data with each of a multiplicity of channels of sensor data developed by the multi-channel sensor arrangement.

8. The apparatus of claim 7, wherein the multi-channel sensor arrangement comprises at least one of a multi-channel ground penetrating radar and a multi-unit electromagnetic imaging sensor.

9. The apparatus of claim 1, wherein the sensor arrangement comprises a multiplicity of disparate sensors that provide disparate subsurface sensor data, and the processor is configured to associate the position data with disparate sensor data developed by the multiplicity of disparate sensors.

10. The apparatus of claim 9, wherein the multiplicity of disparate sensors comprises two or more of a ground penetrating radar, an electromagnetic imaging sensor, a shallow application seismic sensor, a magnetic field sensor, a resistivity sensor, and a gravity sensor.

11. The apparatus of claim 1, wherein the position sensor is affixed on the platform laterally offset relative to a centerline of the sensor arrangement.

12. The apparatus of claim 1, wherein the position sensor cooperates with a ground station to track the position sensor relative to a fixed local coordinate system.

13. The apparatus of claim 1, wherein the position sensor comprises a laser positioning sensor.

14. The apparatus of claim 1, wherein the position sensor comprises a GPS positioning sensor.

15. The apparatus of claim 14, wherein the processor is configured to apply GPS clock times to GPS location data for each discrete sensor of the sensor arrangement for every trace.

16. The apparatus of claim 1, further comprising:
 a second movable platform mechanically coupled to the movable platform; and
 a second sensor arrangement supported by the second movable platform and configured to provide subsurface sensor data as the second movable platform traverses the path;
 wherein the processor is configured to associate the position data with the sensor data provided by the sensor arrangement and the second sensor arrangement relative to the reference frame and in a manner that accounts for curvilinear dynamic motion of the respective platforms.

17. The apparatus of claim 16, wherein the processor is configured to associate the position data with the sensor data provided by the sensor arrangement and the second sensor arrangement relative to the reference frame using the position sensor affixed only to one of the first and second movable platforms and a fixed location of a coupler that mechanically couples the first and second movable platforms.

18. A method, comprising:
 moving a platform along a path, the platform having a front end, a back end, a longitudinal axis, and at least one axle oriented generally transverse to the longitudinal axis and located between the front and back ends for supporting wheels of the platform;
 acquiring position data relative to a location on the platform other than at a location defined by a plane passing through the at least one axle and normal to the longitudinal axis;
 obtaining subsurface sensor data at the platform as the platform traverses the path;
 associating the position data with the sensor data relative to a reference frame and in a manner that accounts for curvilinear dynamic motion of the platform; and
 producing an output comprising the associated position and sensor data.

19. The method of claim 18, wherein associating comprises associating the position data with the sensor data relative to the reference frame in a manner that accounts for velocity and orientation of the platform.

20. The method of claim 18, wherein associating comprises associating geometrically correct position data with the sensor data relative to the reference frame.

21. The method of claim 18, wherein the subsurface sensor data comprises at least one of ground penetrating radar data, electromagnetic imaging data, shallow application seismic sensor data, magnetic field data, resistivity data, and gravity data.

22. The method of claim 18, wherein the position data comprises GPS positioning data.

23. The method of claim 18, wherein the position data comprises laser positioning data.

24. The method of claim 18, comprising:
obtaining subsurface sensor data from a plurality of discrete subsurface sensors; and
applying clock times to the location data for each sample of sensor data obtained by each discrete subsurface sensor.

25. The method of claim 18, further comprising:
moving a second platform along the path, the second platform mechanically coupled to the platform at a coupling location;
computing second position data for the second platform relative to the coupling location and the location on the platform other than at the location defined by the plane passing through the axle and normal to the longitudinal axis;
obtaining second subsurface sensor data at the second platform as the second platforms traverses the path;
associating the second position data with the second sensor data relative to the reference frame and in a manner that accounts for curvilinear dynamic motion of the second platform; and
producing an output comprising the associated second position data and second sensor data.

26. The method of claim 18, wherein associating the position data and producing the output are performed after completion of a survey involving the moving, acquiring, and obtaining processes.

* * * * *